United States Patent
Uemura et al.

(10) Patent No.: US 9,084,148 B2
(45) Date of Patent: Jul. 14, 2015

(54) COMMUNICATIONS BASED ON MEASUREMENTS USING AND NOT USING A MEASUREMENT GAP

(71) Applicant: Sharp Kabushiki Kaisha, Osaka-shi, Osaka (JP)

(72) Inventors: Katsunari Uemura, Osaka (JP); Waho Oh, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/105,400

(22) Filed: Dec. 13, 2013

(65) Prior Publication Data

US 2014/0099939 A1 Apr. 10, 2014

Related U.S. Application Data

(62) Division of application No. 13/120,119, filed as application No. PCT/JP2009/065834 on Sep. 10, 2009, now Pat. No. 8,639,239.

(30) Foreign Application Priority Data

Sep. 22, 2008 (JP) .................................. 2008-243263

(51) Int. Cl.
*H04W 24/00* (2009.01)
*H04W 24/10* (2009.01)
(Continued)

(52) U.S. Cl.
CPC .......... *H04W 24/08* (2013.01); *H04W 36/0088* (2013.01); *H04W 24/10* (2013.01)

(58) Field of Classification Search
None
See application file for complete search history.

(56) References Cited

U.S. PATENT DOCUMENTS 7,688,799 B2 3/2010 Yamamoto
7,787,881 B2 8/2010 Ueda
(Continued)

FOREIGN PATENT DOCUMENTS

EP 1 511 241 A2 3/2005
JP 2003-078957 A 3/2003
(Continued)

OTHER PUBLICATIONS

"W-CDMA Mobile Communication Sysem" by Keiji Tachikawa, ISBN 4-621-04894-5 (Maruzen Ltd, Jun. 2001).
(Continued)

*Primary Examiner* — Philip Sobutka
(74) *Attorney, Agent, or Firm* — Birch, Stewart, Kolasch & Birch, LLP

(57) ABSTRACT

A mobile station apparatus provided in a mobile communication system that includes a base station apparatus and the mobile station apparatus, where the mobile station apparatus is configured to perform communications with the base station apparatus by using a plurality of frequencies together and the plurality of frequencies being configured by the base station apparatus. The mobile station apparatus includes a first circuitry configured or programmed to notify the base station apparatus of a mobile station apparatus capability indicating measurement ability for first measurement or second measurement on the communication, where the first measurement using a measurement gap and the second measurement not using a measurement gap. The mobile station apparatus also includes a second circuitry configured or programmed to perform the first measurement or the second measurement, based on information for the measurement gap, reception quality of one of the frequencies and the measurement ability.

3 Claims, 19 Drawing Sheets

(51) Int. Cl.
*H04W 24/08* (2009.01)
*H04W 36/00* (2009.01)

(56) References Cited

U.S. PATENT DOCUMENTS

| | | | |
|---|---|---|---|
| 7,917,113 | B2 | 3/2011 | Palenius et al. |
| 8,358,629 | B2 | 1/2013 | Grilli et al. |
| 8,639,239 | B2* | 1/2014 | Uemura et al. ............... 455/423 |
| 2002/0006119 | A1 | 1/2002 | Steudle |
| 2003/0045333 | A1 | 3/2003 | Kimata et al. |
| 2005/0083873 | A1 | 4/2005 | Yamamoto |
| 2005/0286468 | A1 | 12/2005 | Agin et al. |
| 2006/0034245 | A1 | 2/2006 | Nguyen |
| 2006/0126577 | A1 | 6/2006 | Yano et al. |
| 2006/0165028 | A1 | 7/2006 | Hiraki et al. |
| 2006/0183482 | A1 | 8/2006 | Ueda |
| 2006/0293008 | A1 | 12/2006 | Hiraki et al. |
| 2007/0037594 | A1 | 2/2007 | Palenius et al. |
| 2007/0097914 | A1 | 5/2007 | Grilli et al. |
| 2007/0223611 | A1 | 9/2007 | Ode et al. |
| 2008/0095132 | A1 | 4/2008 | Lindoff et al. |
| 2008/0189970 | A1 | 8/2008 | Wang et al. |
| 2009/0010219 | A1 | 1/2009 | Lee et al. |
| 2009/0135787 | A1 | 5/2009 | Uemura et al. |
| 2009/0203381 | A1 | 8/2009 | Ueda |
| 2010/0046654 | A1 | 2/2010 | Ode et al. |
| 2011/0105048 | A1 | 5/2011 | Nakao et al. |
| 2014/0348016 | A1 | 11/2014 | Uemura et al. |

FOREIGN PATENT DOCUMENTS

| | | | |
|---|---|---|---|
| JP | 2003-525555 A | 8/2003 | |
| JP | 2005-64571 A | 3/2005 | |
| JP | 2005-64752 A | 3/2005 | |
| JP | 2005-79738 A | 3/2005 | |
| JP | 2005-522121 A | 7/2005 | |
| JP | 2005-354196 A | 12/2005 | |
| JP | 2006-60809 A | 3/2006 | |
| JP | 2006-173861 A | 6/2006 | |
| JP | 2006-222845 A | 8/2006 | |
| JP | 2007-129588 A | 5/2007 | |
| JP | 2008-205566 A | 9/2008 | |
| WO | 01/65882 A1 | 9/2001 | |
| WO | WO 2006/046307 A1 | 5/2006 | |
| WO | WO 2007/053851 A2 | 5/2007 | |
| WO | WO 2008/102531 A1 | 8/2008 | |
| WO | WO 2010/007763 A1 | 2/2010 | |

OTHER PUBLICATIONS

3GPP TR 25.814 V1.1.1 (Feb. 2006); Physical Layer Aspects for Evolved UTRA. (http://www.3gpp.org/Specs/html_info/25814_series.htm).
3GPP TR 25.858 V5.0.0 (Mar. 2002); HSDPA Specification related document (http://www.3gpp.org/Specs/html_info/25_series.htm).
3GPP TR 25.903 V0.2.0 (Nov. 2005); Continuous Connectivity for Packet Data Users (http://www.3gpp.org/Specs/html_info/25903.htm).
3GPP TR36.913, Requirements for Further Advancements for E-UTRA V8.0.0. http://www.3gpp.org/ftp/Specs/html-info/36913.htm, Jun. 2008.
3GPP TS36.331 Radio Resource Control (RRC); Protocol specification. V8.2.0. http://www.3gpp.org/ftp/Specs/html-info/36331.htm, May 2008.
3GPP TSG RAN WG2 meeting #62, Kansas City, Missouri, US, May 5-9, 2008, R2-082706.
3GPP TSG-RAN2 Meeting #63, Jeju, Korea, Aug. 18-22, 2008, R2-084739.
Ericsson, R1-082468, 3GPP—TSG-RAN Meeting #53bis, Warsaw, Poland, Jun. 30-Jul. 4, 2008.
ETSI TS 136 300 V8.4.0 (Apr. 2008), Technical Specification, Evolved Universal Terrestrial Radio Access (E-UTRA) and Evolved Universal Terrestrial Radio Access (E-UTRAN); Overall desription; Stage 2.
International Search Report issued in International Application No. PCT/JP2007/060459 on Aug. 21, 2007.
International Search Report issued in International Application No. PCT/JP2009/065834 on Dec. 15, 2009.
Notice of Allowance issued in U.S. Appl. No. 13/120,119 dated Sep. 13, 2013.
NTT DoCoMo, Inc. "Measurement for LTE Intra-and Inter-RAT Mobility", 3GPP TSGRAN WG2 Meeting #50, Sophia Antipolis, France Jan. 9-13, 2006, R2-060086 (http://www.3gpp.org/ftp/fsgran/WG2 RL2/TGS2 50/Documents/).
Qualcomm Europe, 3GPP, RAN2 #50, Sophia Antipolis, France, Jan. 9-13, 2006, R2-060058.
Qualcomm Europe, 3GPP, Ran2 #56bis, Sorrento, Italy, Jan. 15-19, 2007, R2-070239.
Supplementary European Search Report issued in European Patent Application No. 07 74 3893 on Jan. 16, 2013.
Supplementary European Search Report issued in European Patent Application No. 09 81 4520 on Dec. 11, 2012.
U.S. Office Action issued in U.S. Appl. No. 12/299,150 on Aug. 26, 2011.
U.S. Office Action issued in U.S. Appl. No. 14/454,311 on Feb. 18, 2015.

* cited by examiner

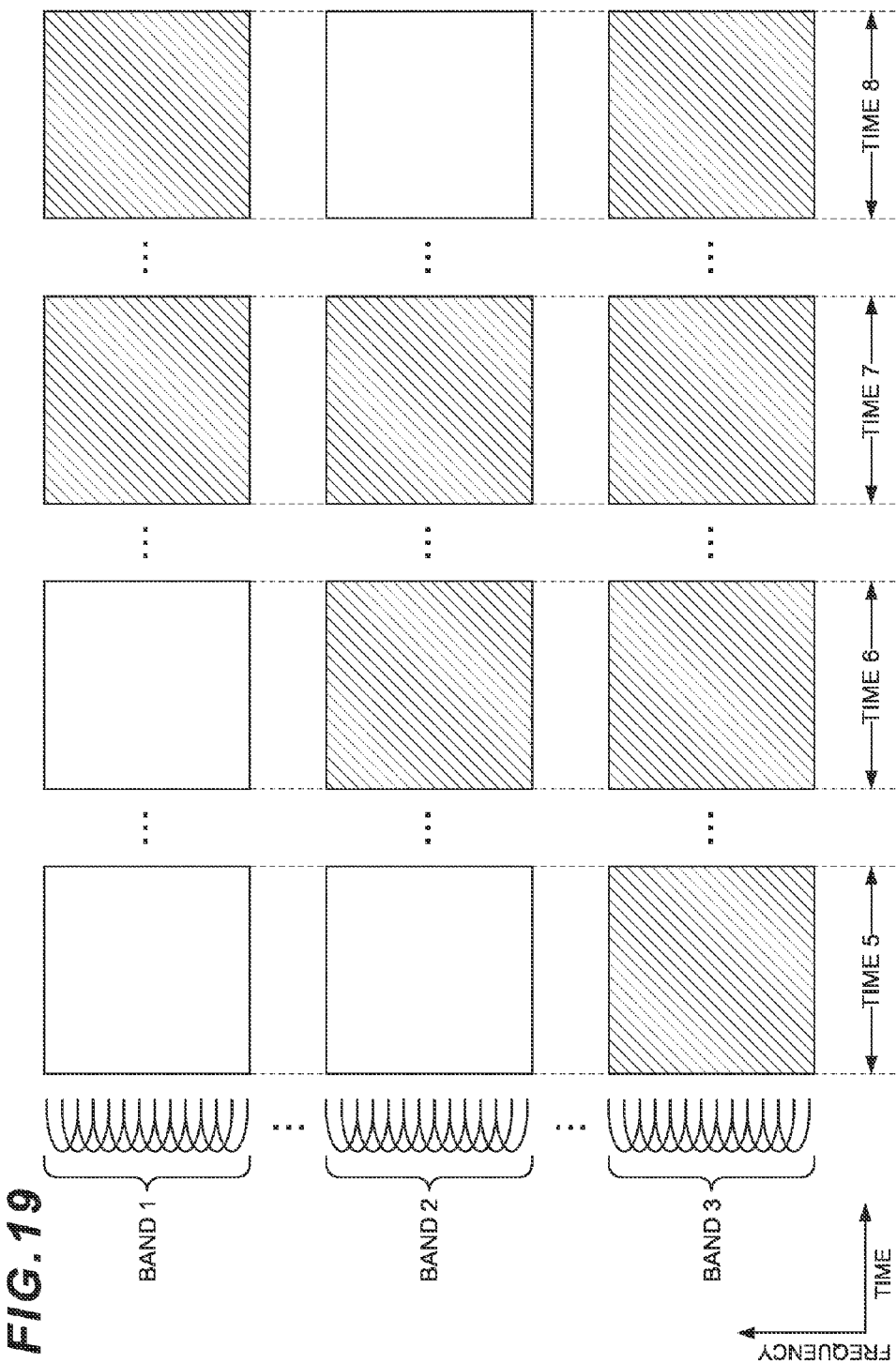

COMMUNICATIONS BASED ON MEASUREMENTS USING AND NOT USING A MEASUREMENT GAP

CROSS-REFERENCE TO RELATED APPLICATIONS

This application is a Divisional of co-pending application Ser. No. 13/120,119 filed on May 23, 2011, and for which priority is claimed under 35 U.S.C. §120, application Ser. No. 13/120,119 is the national phase of PCT International Application No. PCT/JP2009/065834 filed on Sep. 10, 2009 under 35 U.S.C. §371, which claims the benefit of priority of JP 2008-243263 filed Sep. 22, 2008. The entire contents of each of the above-identified applications are hereby incorporated by reference.

TECHNICAL FIELD

The present invention relates to a base station apparatus, mobile station apparatus, mobile communication system and communication method for measuring different frequencies.

BACKGROUND ART

Conventionally, in the standardization organization 3GPP (3rd Generation Partnership Project), studies have proceeded on Evolved Universal Terrestrial Radio Access (hereinafter, referred to as "EUTRA") evolved from the 3rd-generation mobile communication system, and Advanced EUTRA (also referred to as "LTE-Advance") that is the further advanced form (Non-patent Document 1).

In Advanced EUTRA, Carrier Aggregation is proposed as techniques for enabling higher data transmission while maintaining compatibility with EUTRA (for example, Non-patent Document 2). Carrier Aggregation is techniques for preparing a reception apparatus having a reception bandwidth exceeding transmission bandwidths of transmission apparatuses, concurrently transmitting data from a plurality of transmission apparatuses configure for mutually different frequency bands, receiving in the reception apparatus the data concurrently transmitted from the plurality of transmission apparatuses, and thereby improving the data rate. In addition, hereinafter, the reception apparatus is described as a mobile station apparatus, and the transmission apparatus is described as a base station apparatus, but it is not necessary to limit the application scope of the invention to these apparatuses.

Then, in order to perform Carrier Aggregation effectively, it is necessary not to configure a frequency band of poor quality as a reception band. For this reason, the mobile station apparatus needs to perform Inter-Frequency Measurement. As a conventional method of Inter-Frequency Measurement, EUTRA adopts a method in which the base station apparatus configures a measurement gap during which transmission and reception is not performed (Non-patent Document 3). Meanwhile, for example, Patent Document 1 discloses a method in which the frequency band is divided into a main band and an expansion band, any measurement gap is not configure, the main band and a plurality of expansion bands are concurrently received, and an increase/decrease in the expansion band is determined based on the obtained quality information.
Patent Document 1: International Publication No. WO2006-046307
Non-patent Document 1: 3GPP TR36.913, Requirements for Further Advancements for E-UTRA.V8.0.0 http://www.3gpp.org/ftp/Spec/html-info/36913.htm
Non-patent Document 2: Ericsson, R1-082468, 3GPP TSG-RAN1 Meeting #53bis, Warsaw, Poland, Jun. 30-Jul. 4, 2008
Non-patent Document 3: 3GPP TS36.331, Radio Resource Control (RRC); Protocol specification, V8.2.0 http://www.3gpp.org/ftp/Spec/html-info/36331.htm

DISCLOSURE OF INVENTION

Problems to be Solved by the Invention

However, studies have so far not being made on timing and measurement method for the mobile station apparatus (hereinafter, simply referred to as "mobile station apparatus") of Advanced EUTRA to perform Inter-Frequency Measurement. Particularly, with respect to the method of Inter-Frequency Measurement when the mobile station apparatus is capable of concurrently receiving a plurality of frequency bands, any method is not disclosed in Patent Document 1 and Non-patent Documents 1 to 3.

The present invention was made in view of such circumstances, and it is an object of the invention to provide a base station apparatus, mobile station apparatus, mobile communication system and communication method for enabling appropriate Inter-Frequency Measurement to be achieved when the mobile station apparatus is capable of concurrently receiving a plurality of frequency bands.

Means for Solving the Problem (1) To attain the above-mentioned object, the invention took measures as described below. In other words, a base station apparatus of the invention is a base station apparatus in a mobile communication system comprised of a plurality of base station apparatuses for performing transmission using mutually different frequency bands, and a mobile station apparatus capable of concurrently communicating with each of the base station apparatuses, and is characterized by making a determination whether the mobile station apparatus needs to perform Inter-Frequency Measurement to communicate with the plurality of base station apparatuses, and when Inter-Frequency Measurement is needed as a result of the determination, based on the number of frequency bands of base station apparatuses that concurrently communicate with the mobile station apparatus and the number of frequency bands that the mobile station apparatus is capable of concurrently receiving, selecting one of a first Inter-Frequency Measurement method without the need for providing a measurement gap in one of the frequency bands, and a second Inter-Frequency Measurement method with the need for providing a measurement gap in one of the frequency bands.

Thus, selected is one of the first Inter-Frequency Measurement method without the need for providing a measurement gap in one of the frequency bands, and the second Inter-Frequency Measurement method with the need for providing a measurement gap in one of the frequency bands. Therefore, for example, in the case of the first Inter-Frequency Measurement method, since the mobile station apparatus does not need to generate a measurement gap for Inter-Frequency Measurement, it is possible to enhance throughput of downlink data. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports to the base station apparatus, and it is thereby possible to control the power consumption amount to within low levels. Furthermore, when the mobile station apparatus is capable of performing Inter-Frequency Measurement without a measurement gap, since the need is eliminated for generating the measurement gap, scheduling is simplified.

(2) Further, the base station apparatus of the invention is characterized by determining whether or not the Inter-Frequency Measurement is needed based on a measurement result of communication quality reported from the mobile station apparatus, a downlink data buffer amount and downlink throughput status, and notifying the mobile station apparatus of a determination result using a control message.

Thus, the base station apparatus determines whether or not the Inter-Frequency Measurement is needed based on at least one of a measurement result of communication quality reported from the mobile station apparatus, a downlink data buffer amount and downlink throughput status, notifies the mobile station apparatus of a determination result using a control message, and is thereby capable of making the mobile station apparatus perform Inter-Frequency Measurement corresponding to conditions of the communication quality and the like.

(3) Furthermore, the base station apparatus of the invention is characterized by selecting the first Inter-Frequency Measurement method when the number of frequency bands of base station apparatuses that concurrently communicate with the mobile station apparatus is lower than the number of frequency bands that the mobile station apparatus is capable of concurrently receiving.

Thus, when the number of frequency bands of base station apparatuses that concurrently communicate with the mobile station apparatus is lower than the number of frequency bands that the mobile station apparatus is capable of concurrently receiving, the base station apparatus selects the first Inter-Frequency Measurement method, and therefore, in the case that an unused receiver exits in the mobile station apparatus, the mobile station apparatus is capable of performing the first Inter-Frequency Measurement. As a result, for example, in the case of the first Inter-Frequency Measurement method, the mobile station apparatus does not need to generate a measurement gap for Inter-Frequency Measurement, and it is thereby possible to improve throughput of downlink data.

(4) Still furthermore, the base station apparatus of the invention is characterized by selecting the second Inter-Frequency Measurement method when the number of frequency bands of base station apparatuses that concurrently communicate with the mobile station apparatus is the same as the number of frequency bands that the mobile station apparatus is capable of concurrently receiving.

Thus, when the number of frequency bands of base station apparatuses that concurrently communicate with the mobile station apparatus is the same as the number of frequency bands that the mobile station apparatus is capable of concurrently receiving, the base station apparatus selects the second Inter-Frequency Measurement method, and therefore, for example, only in the case that all of the receivers are being used in the mobile station apparatus, the mobile station apparatus is capable of performing the second Inter-Frequency Measurement method.

(5) Moreover, the base station apparatus of the invention is characterized by sorting the frequency bands into a main carrier and non-main carrier, and in communicating with the mobile station apparatus, transmitting a control message to the mobile station apparatus using the main carrier.

Thus, the frequency bands are sorted into the main carrier and non-main carrier, and in communicating with the mobile station apparatus, the control message is transmitted to the mobile station apparatus using the main carrier. Therefore, the frequency band to configure a measurement gap can be limited based on a predetermined condition, and it is possible to simplify the processing between the base station apparatus and the mobile station apparatus.

(6) Further, the base station apparatus of the invention is characterized by providing a measurement gap in one of the main carrier and the non-main carrier in the second Inter-Frequency Measurement method.

Thus, in the second Inter-Frequency Measurement method, a measurement gap is provided in on one of the main carrier and the non-main carrier, and it is thereby possible to simplify processing procedures associated with the measurement gap.

(7) Further, a mobile station apparatus of the invention is a mobile station apparatus in a mobile communication system comprised of a plurality of base station apparatuses for performing transmission using mutually different frequency bands, and a mobile station apparatus capable of concurrently communicating with each of the base station apparatuses, and is characterized by performing one of first Inter-Frequency Measurement without the need for providing a measurement gap in one of the frequency bands, and second Inter-Frequency Measurement with the need for providing a measurement gap in one of the frequency bands, based on a control message received from the base station apparatus.

Thus, executed is one of the first Inter-Frequency Measurement method without the need for providing a measurement gap in one of the frequency bands, and the second Inter-Frequency Measurement method with the need for providing a measurement gap in one of the frequency bands. Therefore, for example, in the case of the first Inter-Frequency Measurement method, since the mobile station apparatus does not need to generate a measurement gap for Inter-Frequency Measurement, it is possible to enhance throughput of downlink data. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports to the base station apparatus, and it is thereby possible to control the power consumption amount to within low levels.

(8) Furthermore, the mobile station apparatus of the invention is characterized by having a plurality of receivers that respectively communicate with the base station apparatuses, and when the mobile station apparatus is indicated to perform the first Inter-Frequency Measurement by the control message received from one of the base statin apparatuses, measuring communication quality of a predetermined frequency band using an unused receiver.

Thus, when the mobile station apparatus is indicated to perform the first Inter-Frequency Measurement by the control message received from one of the base statin apparatuses, the mobile station apparatus measures communication quality of a predetermined frequency band using an unused receiver. Therefore, the mobile station apparatus does not need to generate a measurement gap for Inter-Frequency Measurement, and it is thereby possible to enhance throughput of downlink data.

(9) Still furthermore, the mobile station apparatus of the invention is characterized by having a plurality of receivers that respectively communicate with the base station apparatuses, and when the mobile station apparatus is indicated to perform the second Inter-Frequency Measurement by the control message received from one of the base statin apparatuses, measuring communication quality of a predetermined frequency band using one of the receivers being used.

Thus, when the mobile station apparatus is indicated to perform the second Inter-Frequency Measurement by the control message received from one of the base statin apparatuses, the mobile station apparatus measures communication quality of a predetermined frequency band using one of the receivers being used. Therefore, only in the case that all of the receivers are being used, the mobile station apparatus is capable of performing the second Inter-Frequency Measurement method.

(10) Further, a mobile communication system of the invention is characterized by being comprised of the base station apparatus as described above, and the mobile station apparatus as described above.

According to this constitution, for example, in the case of the first Inter-Frequency Measurement method, since the mobile station apparatus does not need to generate a measurement gap for Inter-Frequency Measurement, it is possible to enhance throughput of downlink data. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports to the base station apparatus, and it is thereby possible to control the power consumption amount to within low levels. Furthermore, when the mobile station apparatus is capable of performing Inter-Frequency Measurement without a measurement gap, since the need is eliminated for generating the measurement gap, scheduling is simplified.

(11) Further, a communication method of the invention is a communication method in a mobile communication system comprised of a plurality of base station apparatuses for performing transmission using mutually different frequency bands, and a mobile station apparatus capable of concurrently communicating with each of the base station apparatuses, and is characterized by including at least the steps in the base station apparatus of making a determination whether the mobile station apparatus needs to perform Inter-Frequency Measurement to communicate with the plurality of base station apparatuses, selecting one of a first Inter-Frequency Measurement method without the need for providing a measurement gap in one of frequency bands, and a second Inter-Frequency Measurement method with the need for providing a measurement gap in one of frequency bands, based on the number of frequency bands of base station apparatuses that concurrently communicate with the mobile station apparatus and the number of frequency bands that the mobile station apparatus is capable of concurrently receiving, when Inter-Frequency Measurement is needed as a result of the determination, and notifying the mobile station apparatus of the selected Inter-Frequency Measurement method.

Thus, selected is one of the first Inter-Frequency Measurement method without the need for providing a measurement gap in one of the frequency bands, and the second Inter-Frequency Measurement method with the need for providing a measurement gap in one of the frequency bands. Therefore, for example, in the case of the first Inter-Frequency Measurement method, since the mobile station apparatus does not need to generate a measurement gap for Inter-Frequency Measurement, it is possible to enhance throughput of downlink data. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports to the base station apparatus, and it is thereby possible to control the power consumption amount to within low levels. Furthermore, when the mobile station apparatus is capable of performing Inter-Frequency Measurement without a measurement gap, since the need is eliminated for generating the measurement gap, scheduling is simplified.

Advantageous Effect of the Invention

According to the invention, for example, in the case of the first Inter-Frequency Measurement method, since the mobile station apparatus does not need to generate a measurement gap for Inter-Frequency Measurement, it is possible to enhance throughput of downlink data. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports to the base station apparatus, and it is thereby possible to control the power consumption amount to within low levels. Furthermore, when the mobile station apparatus is capable of performing Inter-Frequency Measurement without a measurement gap, since the need is eliminated for generating the measurement gap, scheduling is simplified.

BRIEF DESCRIPTION OF DRAWINGS

FIG. 19 is a diagram illustrating a conventional state in which the reception frequency is increased or decreased using Carrier Aggregation.

DESCRIPTION OF SYMBOLS

Figure 1:
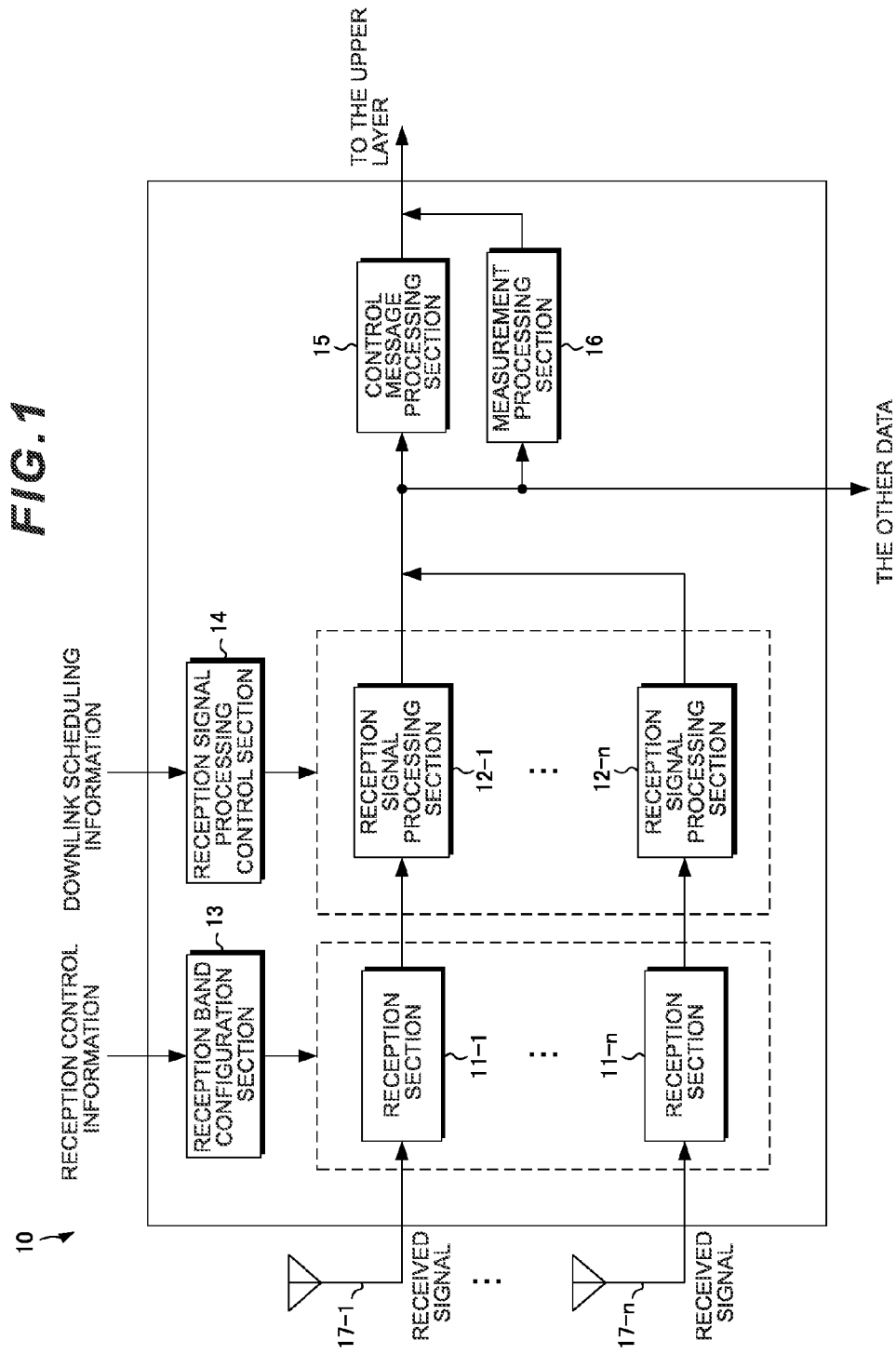
FIG. 1 is a block diagram showing an example of a reception apparatus of a mobile station apparatus in Embodiment 1 of the invention.

10 Reception apparatus (Mobile station apparatus)
11-1~11-n Reception section
12-1~12-n Reception signal processing section
13 Reception band configuration section
14 Reception signal processing control section
15 Control message processing section
16 Measurement processing section
17-1~17-n Antenna
20 Transmission apparatus (Mobile station apparatus)
21 Uplink message generating section
22 Transmission signal processing section
23 Transmission signal processing control section
24 Channel mapping section
25 Transmission section
26 Antenna
30 Reception apparatus (Base station apparatus)
31 Reception section
32 Reception signal processing control section
33 Reception signal processing section
34 Uplink message processing section
35 Inter-base station message processing section
36 Antenna
40 Transmission apparatus (Base station apparatus)
41 Gap determining section
42 Aggregation determining section
43 Downlink message generating section
44 Reception signal processing control section
45 Transmission signal processing section
46 Channel mapping section
47 Transmission section
48 Inter-base station message generating section
49 Antenna
50 Mobile station apparatus
51-1~51-3 Base station apparatus
52-1~52-3 Control station
53 Upper control station
70, 80, 90 Mobile station apparatus
71, 81, 91 Network
140 Mobile station apparatus
141 Band 1 base station apparatus
142 Band 2 base station apparatus
143 Band 3 base station apparatus

BEST MODE FOR CARRYING OUT THE INVENTION

Embodiments according to the invention will be described below with reference to drawings. Described first is Inter-Frequency Measurement using a measurement gap used in EUTRA.

(1) Measurement Gap (Non-Patent Document 3)

Figure 18:
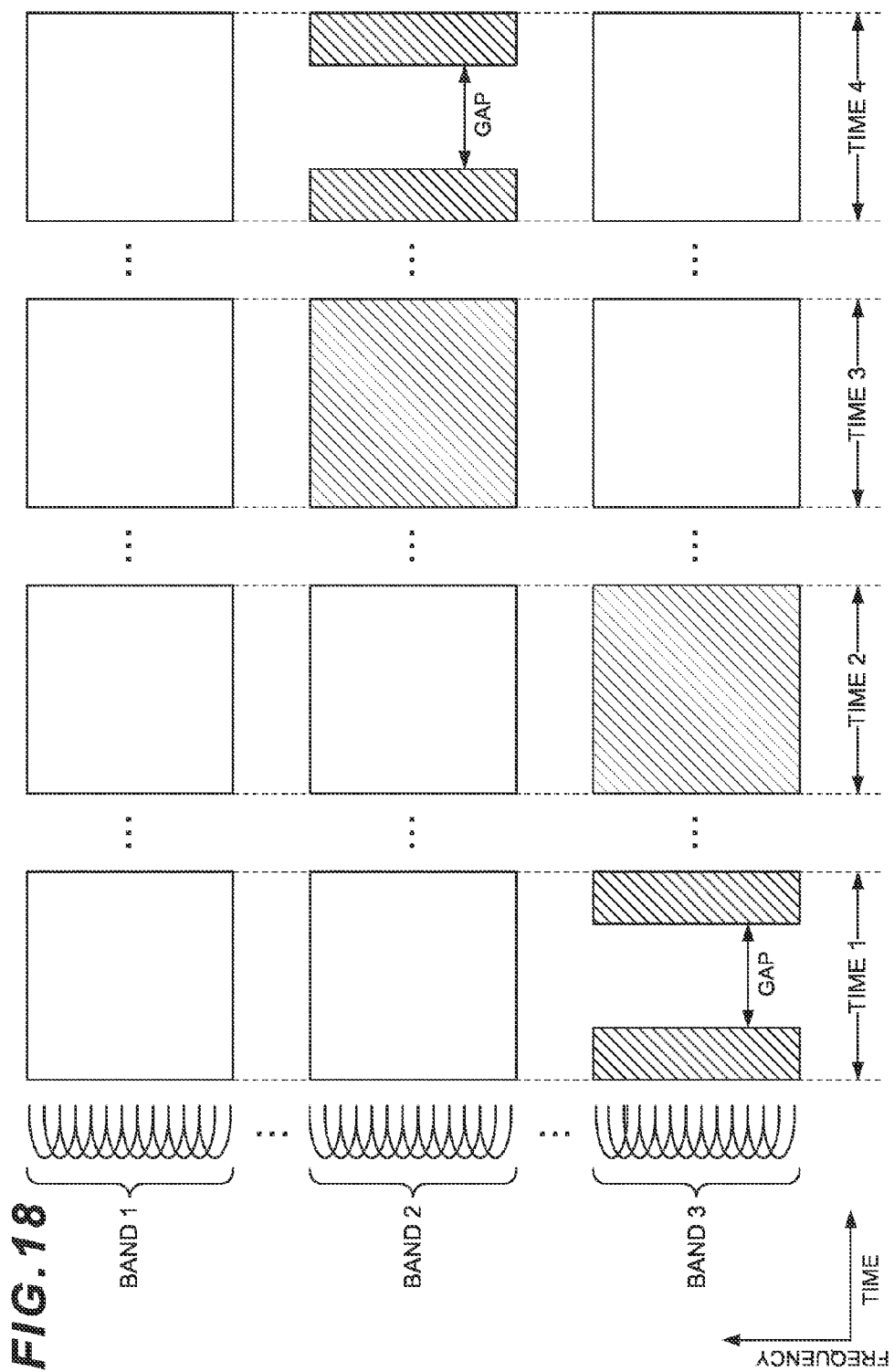
FIG. 18 is a diagram illustrating a conventional Inter-Frequency Measurement method using a measurement gap.

FIG. 18 is a diagram showing an example of Inter-Frequency Measurement using a measurement gap used in EUTRA. Bands 1 to 3 show downlink frequency bands that base station apparatuses respectively transmit, and, for example, the transmission bandwidth is 20 MHz. In addition, Bands 1 to 3 may be continuous frequency bands or frequency bands part or all of which are discontinuous. For example, when usable frequency bands are an 800 MHz-band, 2.4 GHz-band and 3.4 GHz-band, Band 1, Band 2 and Band 3 may be transmitted at 20 MHz respectively at the 800 MHz-band, 2.4 GHz-band and 3.4 GHz-band. In addition, the reception bandwidth of the mobile station apparatus is 20 MHz, and is not able to concurrently receive a plurality of frequency bands. Therefore, the base station apparatus configures a time called the measurement gap (hereinafter, simply referred to as a "gap" in the figure) guaranteed not to assign transmission/reception data, and during the configure time, the mobile station apparatus measures quality of a base station apparatus of a different frequency.

In the example as shown in FIG. 18, the mobile station apparatus and base station apparatus first perform communications using 20 MHz of the Band 3. Herein, when Inter-Frequency Measurement is determined to be necessary in the Band 3, the base station apparatus configures a gap in the Band 3 at some Time 1, and the mobile station apparatus measures different frequencies (Band 1 and Band 2) during the gap period. Further, at another Time 2, the mobile station apparatus reports the measurement of the different frequencies, while handover processing is performed, and the frequencies to communicate are changed to the Band 3 from Time 3. In addition, when Inter-Frequency Measurement is determined to be necessary in the Band 2, the base station apparatus configures a gap in the Band 2 at some Time 4, and the mobile station apparatus measures different frequencies (Band 1 and Band 3) during the gap period. In other words, it is not possible to concurrently receive a plurality of frequency bands. In addition, the time durations of the Time 1 to Time 4 and the gap are arbitrary.

Carrier Aggregation (Non-Patent Document 2)

FIG. 19 is a diagram showing an example of Carrier Aggregation. It is assumed that the frequency band and transmission bandwidth of the base station apparatus are the same as those in FIG. 18. In addition, the mobile station apparatus needs to have a reception bandwidth exceeding 20 MHz, and in this Example, is capable of concurrently receiving up to three frequency bands of 20 MHz, and the total reception bandwidth is 60 MHz. In the example of FIG. 19, the mobile station apparatus communicates with the base station apparatus using 20 MHz of the Band 3 at some time T5, and concurrently measures the Band 1 and Band 2. Further, at another Time 6, the Band 2 is added, and the mobile station apparatus communicates with the base station apparatuses using total 40 MHz of the Band 2 and Band 3, and concurrently measures the Band 1. Furthermore, at another Time 7, the Band 1 is further added, and the mobile station apparatus communicates with the base station apparatuses using total 60 MHz of the Band 1 to Band 3. Still furthermore, at another Time 8, the Band 2 is deleted, and the mobile station apparatus communicates with the base station apparatuses using total 40 MHz of the Band 1 and Band 3, and concurrently measures the Band 2. Thus, by using Carrier Aggregation, without greatly changing the configuration of the base station apparatus, it is possible to remarkably improve the data rate. In addition, the time durations of the Time 5 to Time 8 are variable.

In the case of the communication system for performing Carrier Aggregation as shown in FIG. 19, when the reception bandwidth of the mobile station apparatus is larger than the transmission bandwidth of the base station apparatus, and the mobile station apparatus is capable of concurrently receiving a plurality of frequency bands, it is not necessary to configure a gap in Inter-Frequency Measurement.

(3) Physical Channels

Physical channels used in EUTRA and Advanced EUTRA include the broadcast information channel, uplink data channel, downlink data channel, downlink common control channel, uplink common control channel, random access channel, synchronization signal, reference signal, etc. In EUTRA and Advanced EUTRA, there are possibilities that another physical channel will be added or the channel configuration will be modified in the future, but also in the case that the modification is made, the description of each Embodiment of the invention is not affected. Further, as a reference signal, there are the downlink reference signal and uplink reference signal. The physical channels related to each Embodiment of the invention are the broadcast information channel and downlink reference signal, and detailed descriptions are omitted on the other physical channels.

The broadcast information channel (BCH: Broadcast Channel) is transmitted for the purpose of notifying of control parameters for common use among mobile station apparatuses in the cell. Further, the BCH is sorted into P-BCH (Primary BCH) and D-BCH (Dynamic BCH). Since the P-BCH is beforehand determined to be transmitted at predetermined intervals in time and frequency, the mobile station apparatus is capable of receiving the P-BCH of a cell with the cell ID identified. Meanwhile, transmission resources for the D-BCH are notified on the downlink common control channel, the D-BCH is transmitted using the downlink data channel, and the transmission resources can be made variable for each cell. The D-BCH includes at least a global ID (also referred to as a global cell ID), higher in number than the cell ID, such that only a single global ID is assigned without overlaps among all the cells, and area information (also referred to as a tracking area or tracking area ID).

The downlink reference signal is a pilot signal transmitted with predetermined power as a general rule for each cell. Further, the downlink reference signal is a signal repeated periodically at predetermined time intervals (for example, one frame), and the mobile station apparatus receives a downlink reference signal at predetermined time intervals, and measures the reception quality to determine the reception quality for each cell. Furthermore, the downlink reference signal is used as a signal for reference for demodulation of downlink data that is transmitted concurrently with the downlink reference signal. As a sequence used in the downlink reference signal, any sequence may be used that can be uniquely identified for each cell. In addition, there is the case that the downlink reference signal is described as a DL-RS (Downlink Reference Signal), and the application and meaning is the same.

[Embodiment 1]

Embodiment 1 of the invention will be described below. FIG. 1 is a block diagram showing an example of a reception apparatus of a mobile station apparatus according to Embodiment 1 of the invention. The reception apparatus 10 is comprised of reception sections 11-1 to 11-$n$, reception signal processing sections 12-1 to 12-$n$, reception band configuration section 13, reception signal processing control section 14, control message processing section 15, measurement processing section 16, and antennas 17-1 to 17-$n$. Herein, shown is the example where the numbers of reception sections 11-1 to 11-$n$ and reception signal processing sections 12-1 to 12-$n$ are the same as the number $n$ of the antennas. Further, such a configuration may be adopted that a part or plurality of sections are shared to reduce the number of reception sections (receivers). Furthermore, a configuration provided with the higher number of reception sections (receivers) than the number of antennas may be adopted.

Reception signals (transmission signals from the base station apparatuses) are received in the corresponding reception sections 11-1 to 11-$n$ via the antennas 17-1 to 17-$n$. The number ($n$) of reception sections 11-1 to 11-$n$ is the same as the number of frequency bands that the mobile station apparatus is capable of concurrently receiving. The reception band configuration section 13 receives reception control information. The reception control information includes reception timing of each channel, multiplexing method, resource arrangement information and the like, as well as the frequency bands. The reception band configuration section 13 configures a frequency band to receive on each of the reception sections 11-1 to 11-$n$.

According to the reception control information, the reception sections 11-1 to 11-$n$ receive signals of configure frequency bands, and output the reception signals to respective reception signal processing sections 12-1 to 12-$n$. In addition, a reception section(s) (and antenna(s) and reception processing section(s)) that is not concurrently used may exist.

The downlink scheduling information is input to the reception signal processing control section 14. The downlink scheduling information includes demodulation information of the reception signal and the like. The reception signal processing section 14 configures the downlink scheduling information on each of the reception signal processing sections 12-1 to 12-$n$, and the reception signal processing sections 12-1 to 12-$n$ demodulate respective reception signals. When the demodulated reception signal is a control message (layer 3 message) from the upper layer, the signal is input to the control message processing section 15. Meanwhile, a result concerning the measurement information is input to the measurement processing section 16.

The information, such as, for example, traffic data of user and control data in the lower layer, other than the measurement information processed in the reception signal processing sections 12-1 to 12-$n$ is input to the individual processing block as the other information, but is not related to the invention, and descriptions thereof are omitted.

The control message processing section 15 receives the control message from the base station apparatus, performs control processing corresponding to the content of the control message, and notifies the upper layer of the result. The measurement processing section 16 performs processing for time average, etc. and processing for the reception quality determination etc. on the measurement results, and notifies the upper layer of the obtained results.

Figure 2:
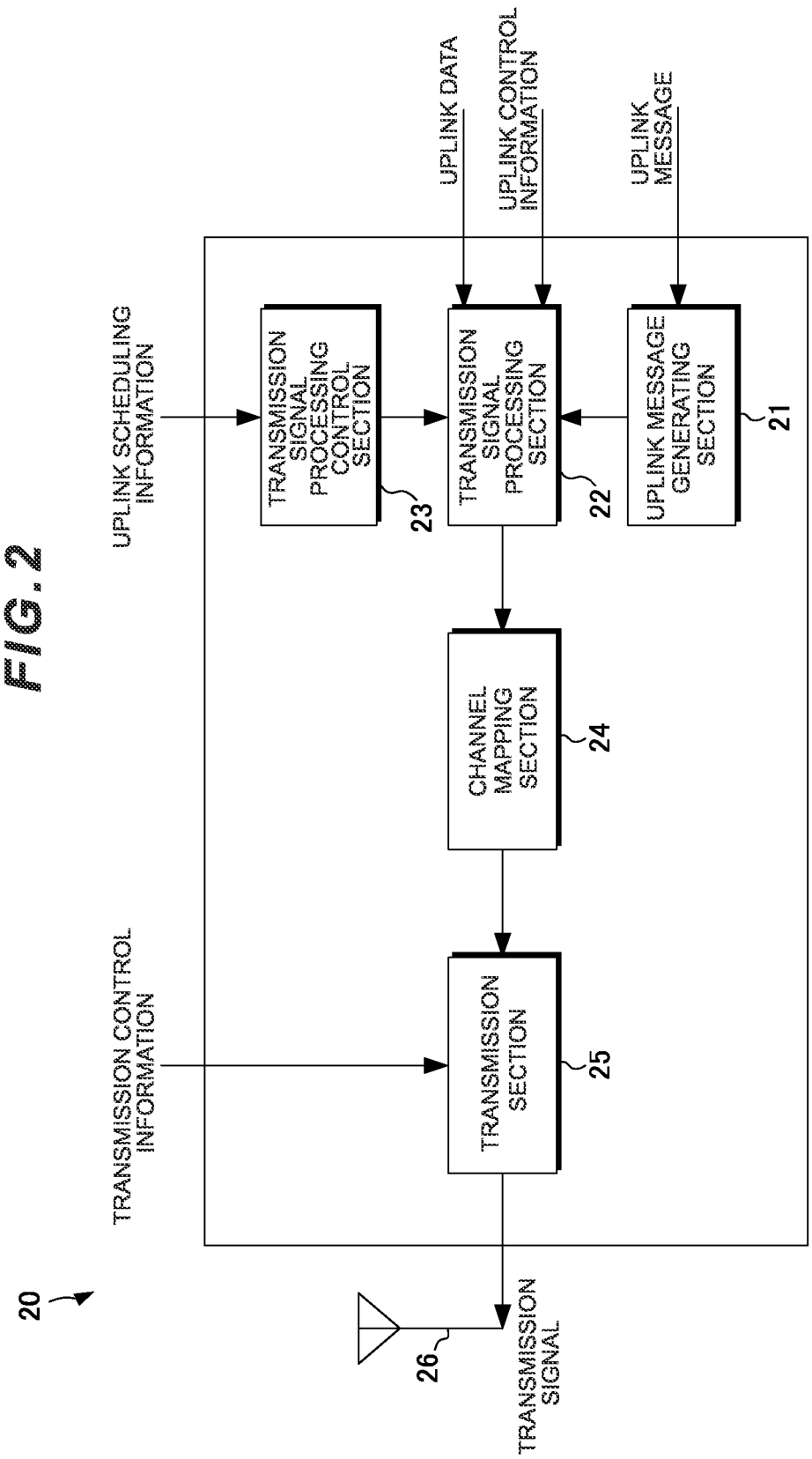
FIG. 2 is a block diagram showing an example of a transmission apparatus of the mobile station apparatus in Embodiment 1 of the invention.

FIG. 2 is a block diagram showing an example of a transmission apparatus of the mobile station apparatus according to Embodiment 1 of the invention. The transmission apparatus 20 is comprised of an uplink message generating section 21, transmission signal processing section 22, transmission signal processing control section 23, channel mapping section 24, transmission section 25 and antenna 26. The uplink message generating section 21 receives information required for generation of an uplink message (layer 3 message) to notify the base station apparatus at appropriate timing according to indications from the upper layer. The uplink message generating section 21 generates each control message corresponding to the input information to output to the transmission signal processing section 22. The transmission signal processing section 22 further receives uplink data and uplink control information.

Further, uplink scheduling information is input to the transmission signal processing control section 23. The uplink scheduling information includes modulation information of the transmission signal, etc. The transmission signal processing control section 23 configures the transmission signal processing section 22 for the uplink scheduling information, and the transmission signal processing section 22 modulates each input data. The modulated data output from the transmission signal processing section 22 based on scheduling is subjected to physical channel mapping in the channel mapping section 24. The physical channel is output from the transmission section 25 through the antenna 26 according to transmission control information. The transmission control information includes transmission timing concerning each physical channel, multiplexing method, resource arrangement information, and other associated information.

In addition, in FIGS. 1 and 2, the other components of the mobile station apparatus are not related to this Embodiment, and descriptions thereof are omitted.

Figure 3:
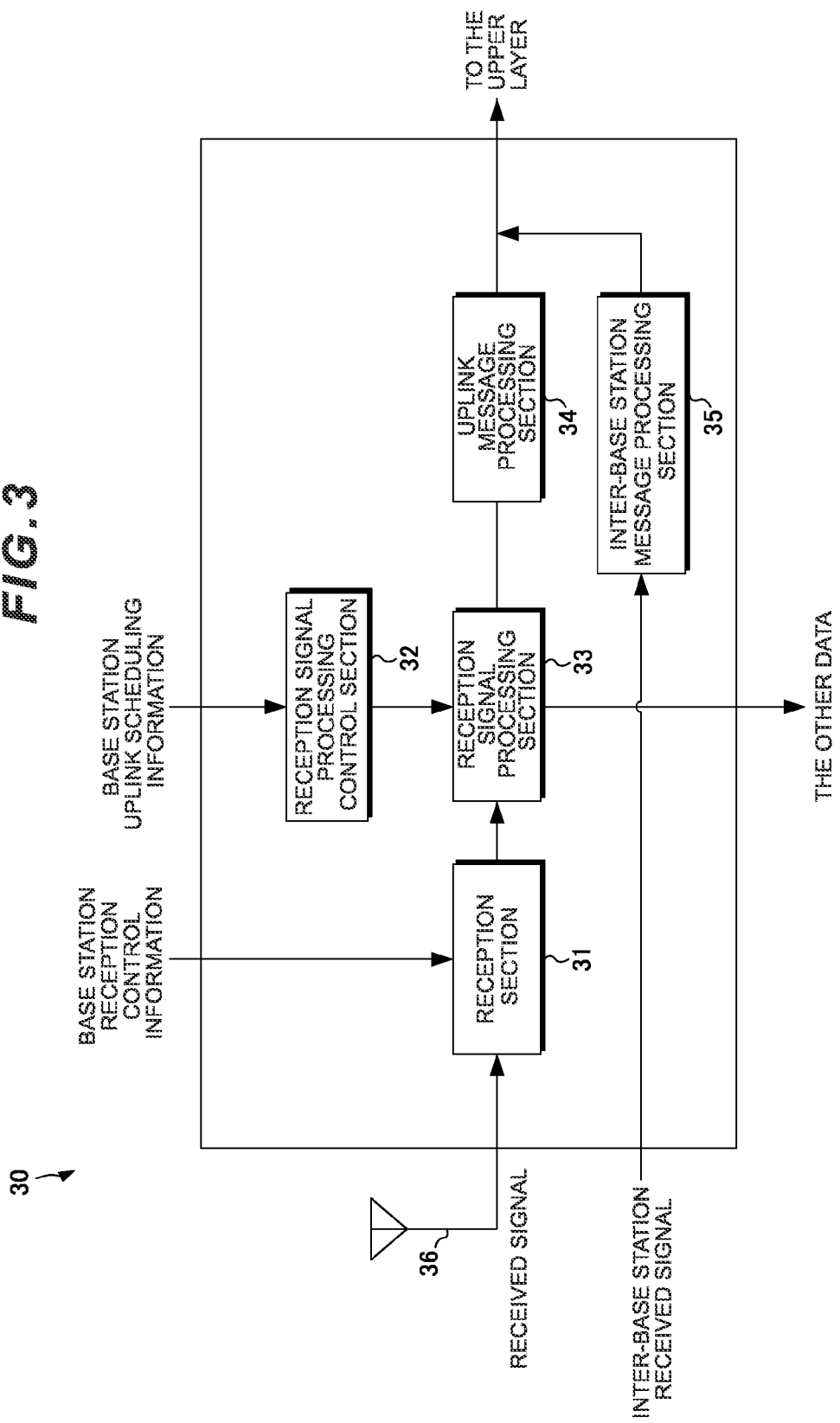
FIG. 3 is a block diagram showing an example of a reception apparatus of a base station apparatus in Embodiment 1 of the invention.

FIG. 3 is a block diagram showing an example of a reception apparatus of the base station apparatus in Embodiment 1 of the invention. The reception apparatus 30 is comprised of a reception section 31, reception signal processing control section 32, reception signal processing section 33, uplink message processing section 34, inter-base station message processing section 35, and antenna 36. A reception signal (transmission signal from the mobile station apparatus) is received in the reception section 31 via the antenna 36. Meanwhile, an inter-base station reception signal (transmission signal from the base station apparatus) is transmitted in a periodical or event manner from an adjacent base station apparatus using a cable such as a dedicated cable, and input to the inter-base station message processing section 35.

The reception section 31 receives the reception signal based on base station reception control information. The base station reception control information includes reception timing concerning each channel for each mobile station apparatus, multiplexing method, resource arrangement information, etc. The reception section 31 outputs the signal received according to the base station reception control information to the reception signal processing section 33. The reception signal processing control section 32 receives base station uplink scheduling information. The base station uplink scheduling information includes demodulation information of the reception signal, etc. The reception signal processing control section 32 configures the uplink scheduling information on the reception signal processing section 33. The reception signal processing section 33 sorts the input signal for each mobile station apparatus, and further, demodulates the signal suitably for each channel. When the input signal is an uplink message from the mobile station apparatus, the signal is input to the uplink message processing section 34. Signals, such as, for example, traffic data of user, uplink control data and other control message except the uplink message processed in the reception signal processing section 33 are input to the individual processing block as the other information, but are not related to the invention, and descriptions thereof are omitted.

The uplink message processing section 34 acquires a control parameter included in each uplink message to output to the upper layer. The inter-base station message processing section 35 acquires a base station control parameter included in each inter-base station message to output to the upper layer.

Figure 4:
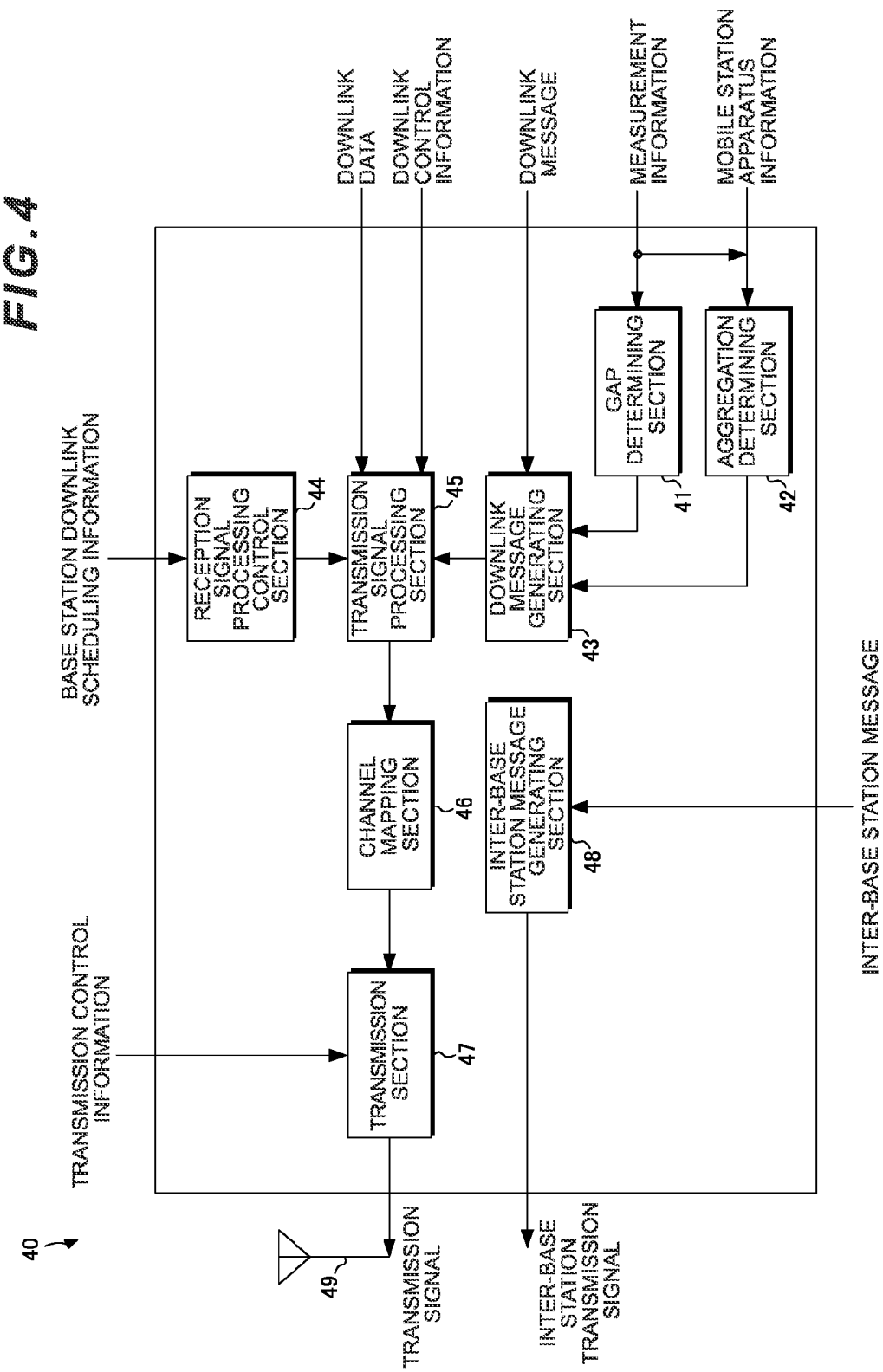
FIG. 4 is a block diagram showing an example of a transmission apparatus of the base station apparatus in Embodiment 1 of the invention.

FIG. 4 is a block diagram showing an example of a transmission apparatus of the base station apparatus in Embodiment 1 of the invention. The transmission apparatus 40 is comprised of a gap determining section 41, Aggregation determining section 42, downlink message generating section 43, reception signal processing control section 44, transmission signal processing section 45, channel mapping section 46, transmission section 47, inter-base station message generating section 48, and antenna 49. The gap determining section 41 receives measurement information from the upper layer. The measurement information is information of measurement results concerning adjacent base station apparatuses reported from the mobile station apparatus. When the gap determining section 41 determines that gap generation is needed based on the measurement information, the section 41 indicates the downlink message generating section 43 to generate a downlink message for gap generation. When the gap is not necessary, the section 41 does not perform any processing.

The Aggregation determining section 42 receives mobile station apparatus information and measurement information, and when Carrier Aggregation is needed, the section 42 indicates the downlink message generating section 43 to generate a downlink message for Carrier Aggregation. The mobile station information is the capability of the mobile station apparatus and a downlink buffer amount of the mobile station apparatus under communication. The downlink message generating section 43 receives information required for generation of a downlink message (layer 3 message) to notify the mobile station apparatus at appropriate timing according to indications from the upper layer. The downlink message generating section 43 generates each control message corresponding to the input information. The transmission signal processing section 45 receives the downlink message, downlink data and downlink control information.

The transmission signal processing control section 44 receives base station downlink scheduling information. The base station downlink scheduling information includes modulation information of the transmission signal, etc. The transmission signal processing control section 44 configures the base station downlink scheduling information on the transmission signal processing section 45, and the transmission signal processing section 45 modulates each input data. The modulated data output from the transmission signal processing section 45 based on scheduling is subjected to physical channel mapping in the channel mapping section 46.

The physical channel is output from the transmission section 47 through the antenna 49 according to transmission control information. The transmission control information includes transmission timing concerning each physical channel, multiplexing method, resource arrangement information, and other associated information. Meanwhile, the inter-base station message is input to the inter-base station message generating section 48, and output as an inter-base station transmission signal using the cable such as the dedicated cable. In addition, in FIGS. 3 and 4, the other components of the base station apparatus are not related to the invention, and therefore, are omitted.

Figure 5:
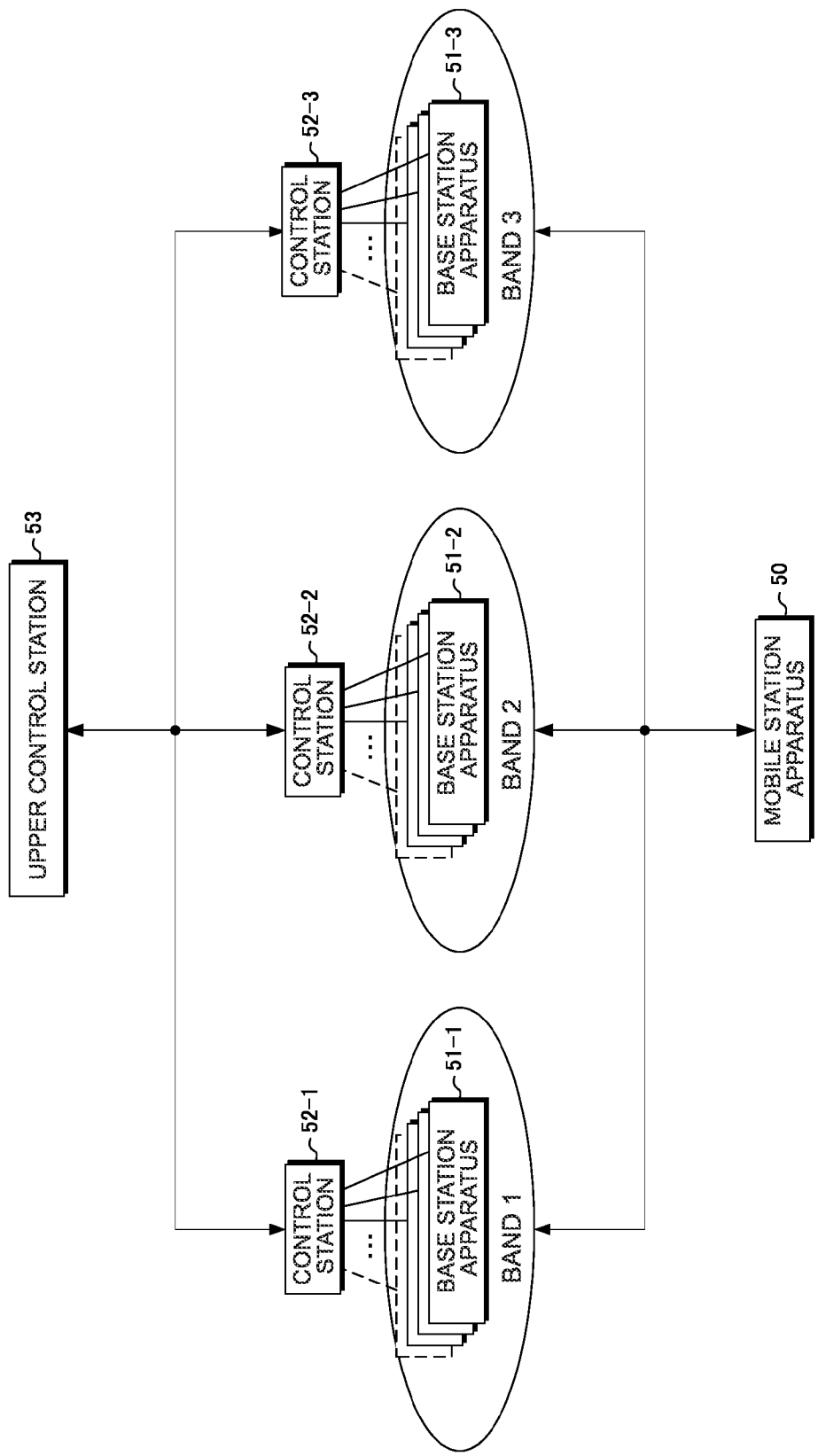
FIG. 5 is a diagram illustrating a network configuration in Embodiment 1 of the invention.

FIG. 5 is a diagram showing an example of a network configuration suitable for the Embodiment of the invention. By Carrier Aggregation, a mobile station apparatus 50 is capable of concurrently communicating data with base station apparatuses 51-1 to 51-3 in a plurality of frequency bands (Band 1 to Band 3). Meanwhile, in the frequency bands, the base station apparatuses 51-1 to 51-3 are managed by control stations 52-1 to 52-3, respectively. Further, an upper control station 53 exists that manages the control stations 52-1 to 52-3. In addition, it is possible to construct a network configuration including only the upper control station 53 and base station apparatuses 51-1 to 51-3 with the control stations 52-1 to 52-3 omitted.

Figure 6:
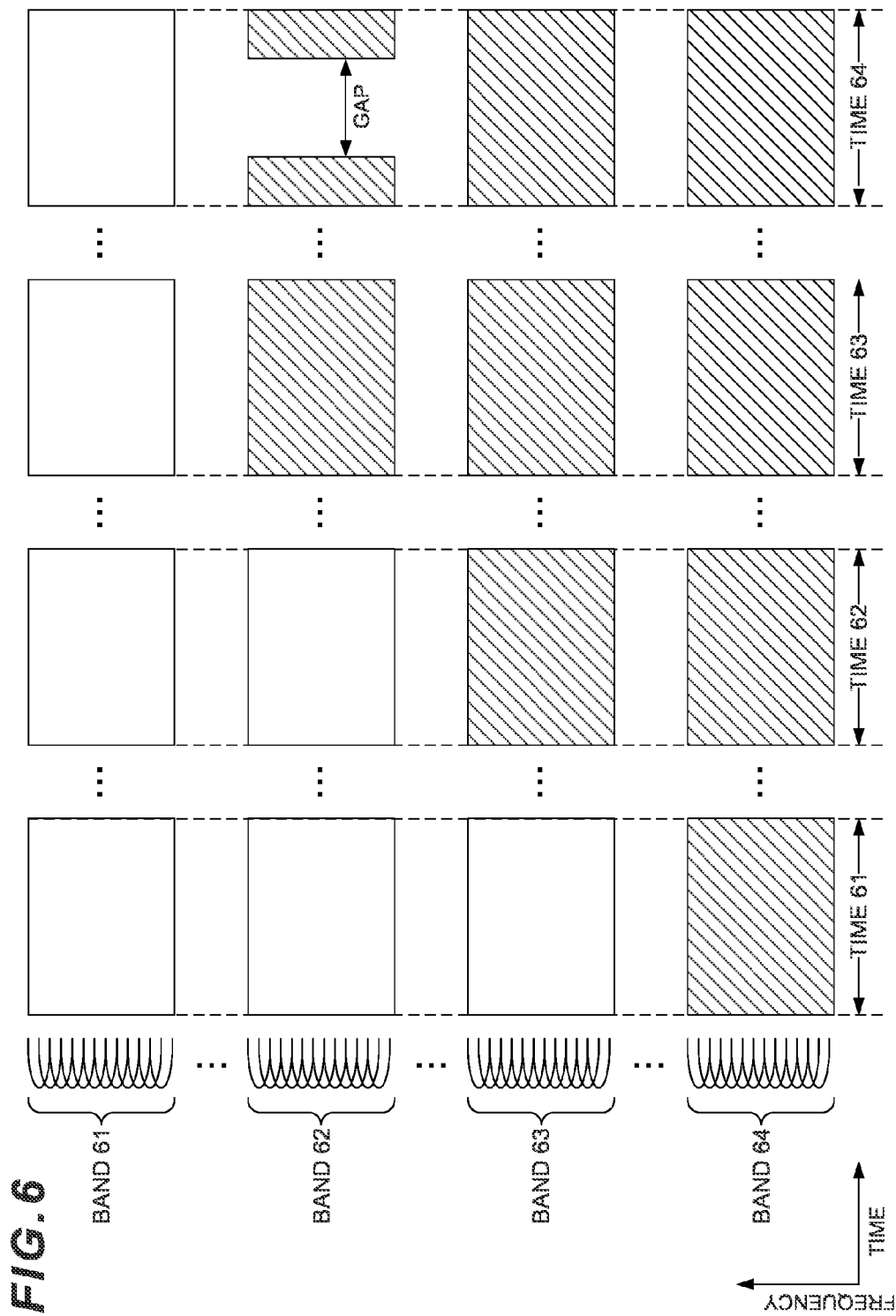
FIG. 6 is a diagram illustrating a method of Inter-Frequency Measurement in the mobile station apparatus in Embodiment 1 of the invention.

FIG. 6 is a diagram showing an example of gap control and Inter-Frequency Measurement in the mobile station apparatus of the invention. The Inter-Frequency Measurement means that the mobile station apparatus measures frequency bands other than the frequency band being received. Band 61 to Band 64 represent downlink frequency bands transmitted from base station apparatuses, respectively, and the transmission bandwidth is equal to any one of transmission bandwidths of the base station apparatus used in EUTRA, and for example, 20 MHz. In addition, Band 61 to Band 64 may be continuous frequency bands, or frequency bands a part or all of which are discontinuous. Herein, when the mobile station apparatus is capable of concurrently receiving up to three 20 MHz-reception bandwidths (i.e. the mobile station apparatus is provided with three receivers (reception sections) and has the reception bandwidth of total 60 MHz), the mobile station apparatus is always notable to receive one frequency band (i.e. one frequency band among Band 61 to Band 64).

The description is given with reference to FIG. 6. When the mobile station apparatus communicates with the base station apparatus using 20 MHz of the Band 64 at some Time 61, the mobile station apparatus is capable of measuring the remaining Band 61 to Band 63 while communicating with the base station apparatus in the Band 64. Further, when the mobile station apparatus communicates with base station apparatuses using total 40 MHz of the Band 63 and Band 64 by Carrier Aggregation at some different Time 62, the mobile station apparatus is capable of measuring the remaining Band 61 and Band 62. However, when the mobile station apparatus communicates with base station apparatuses using total 60 MHz of the Band 62 to Band 64 at some different Time 63 by Carrier Aggregation, the mobile station apparatus is not able to measure the Band 61. Therefore, to measure the Band 61, as shown in the example of Time 64, it is necessary to generate a gap in some frequency band (Band 62 in FIG. 6), halt reception of the Band 62 in the gap period, and measure the Band 61 during the period.

Figure 7:
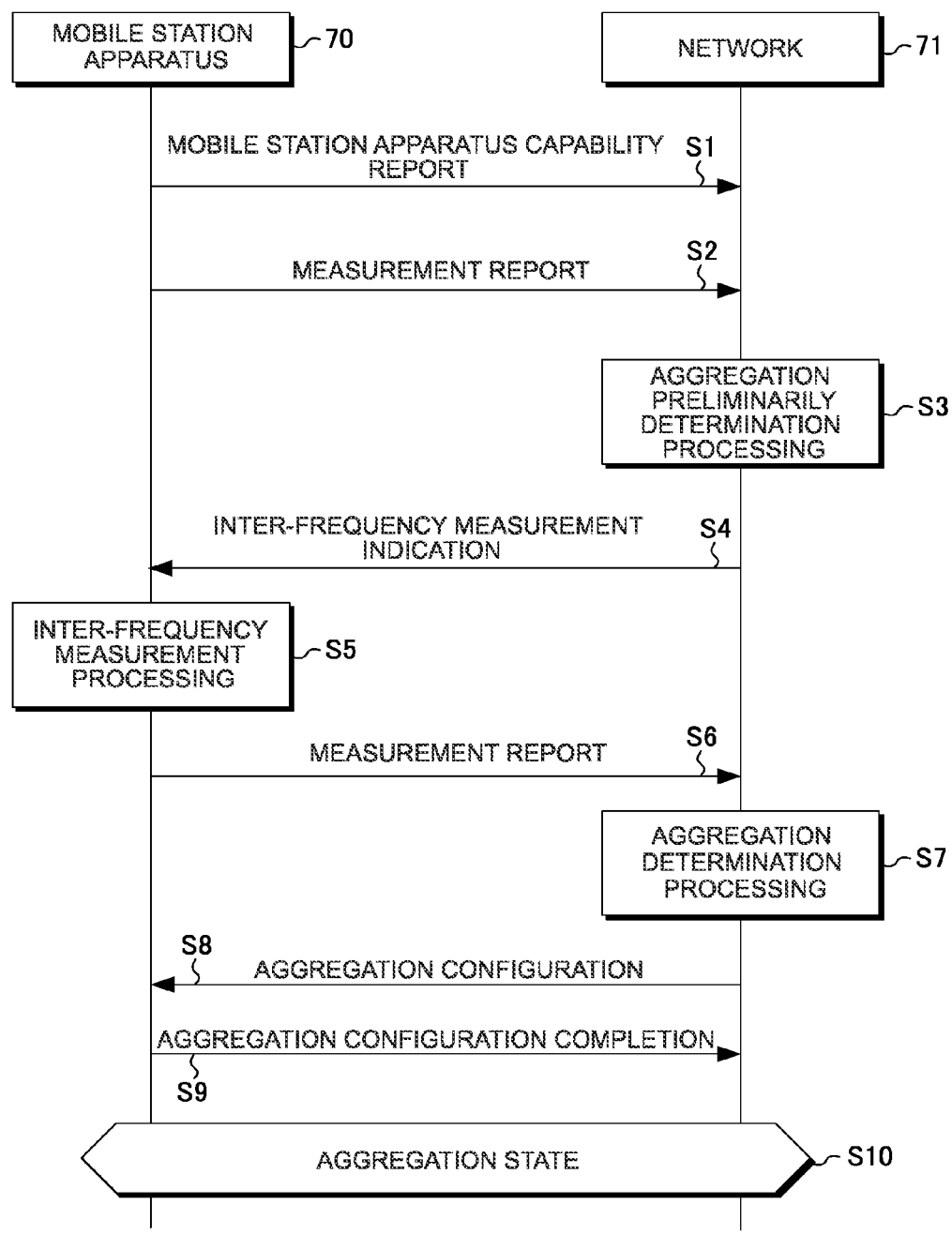
FIG. 7 is a sequence chart illustrating an Inter-Frequency Measurement procedure in the mobile station apparatus in Embodiment 1 of the invention.

FIG. 7 is a diagram showing an example of a sequence chart illustrating Inter-Frequency Measurement without the need for gap control. FIG. 7 illustrates a procedure for shifting from a state of not performing Carrier Aggregation to another state of performing Carrier Aggregation. It is assumed that a mobile station apparatus 70 of this Example has at least a reception bandwidth wider than 20 MHz, while having the capability enabling Carrier Aggregation, and is in the state where Carrier Aggregation is not perform (the state of Time 61 in FIG. 6). A network 71 in the figure includes base station apparatuses, control stations and upper control station.

First, the mobile station apparatus 70 transmits a mobile station apparatus capability report to the network 71 using an uplink message (step S1). The mobile station apparatus capability report includes at least information of frequency bands capable of being received, availability of Carrier Aggregation, and the maximum number of frequency bands capable of being concurrently be received. It is desirable that the mobile station apparatus capability report is transmitted at least before the mobile station apparatus makes a measurement report in a communicating state, and more suitably, is transmitted during the position registration procedure. Subsequently, in the communicating state, the mobile station apparatus 70 measures the serving cell and adjacent cells of the same frequencies, and includes the measurement result in a measurement report message to transmit to the network 71 (step S2). The network 71 performs Aggregation preliminarily determination processing in a periodical or event manner (step S3), and when it is determined that the state requires Carrier Aggregation, transmits an Inter-Frequency Measurement indication message to the mobile station apparatus 70 (step S4).

Based on the control information indicated by the Inter-Frequency Measurement indication message, the mobile station apparatus 70 performs the Inter-Frequency Measurement processing (step S5), and includes the measurement result of the Inter-Frequency Measurement in a measurement report message to transmit (step S6). The network 71 receives the measurement report message, performs the Aggregation determination processing based on the measurement result (step S7), and in the case of performing Carrier Aggregation, includes a frequency band for the mobile station apparatus 70 to newly receive in an Aggregation configuration message to transmit (step S8). The mobile station apparatus 70 starts reception processing of the designated frequency band, while transmitting an Aggregation configuration complete message to the network (step S9). By this means, the mobile station apparatus 70 and network 71 become the Aggregation state (step S10).

Figure 8:
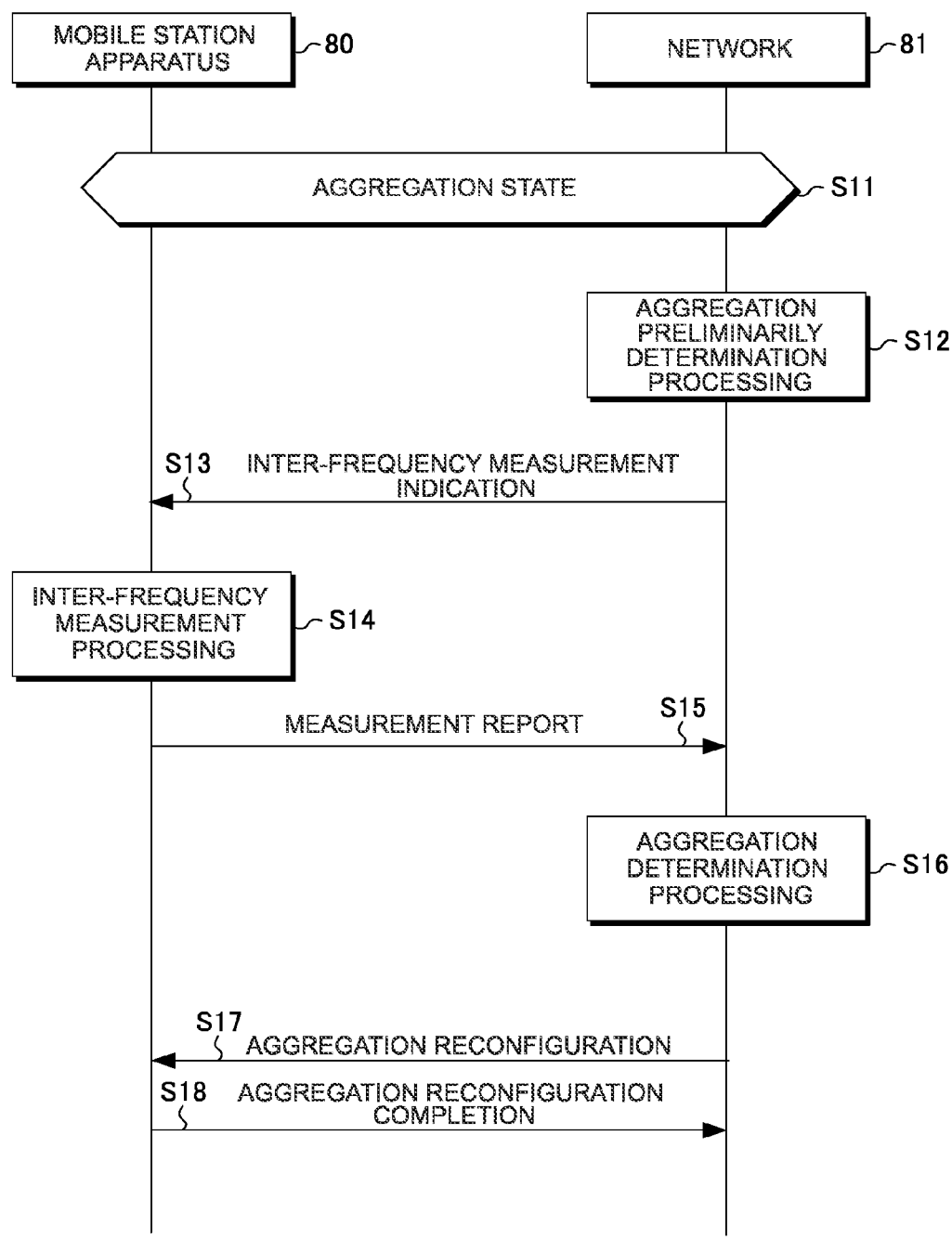
FIG. 8 is another sequence chart illustrating the Inter-Frequency Measurement procedure in the mobile station apparatus in Embodiment 1 of the invention.

FIG. 8 is a diagram showing another example of the sequence chart illustrating Inter-Frequency Measurement without the need for gap control. FIG. 8 illustrates a procedure for changing the configuration of Carrier Aggregation. It is assumed that a mobile station apparatus 80 of this Example has at least a reception bandwidth wider than 20 MHz, while having the capability enabling Carrier Aggregation. Further, it is assumed that the apparatus 80 is in the Carrier Aggregation state (step S11) with all the reception bandwidths being not used yet (the state of Time 62 in FIG. 6). A network 81 in the figure includes base station apparatuses, control stations and upper control station.

The network 81 performs Aggregation preliminarily determination processing in a periodical or event manner (step 12), and when it is determined that the state requires additional Carrier Aggregation, transmits an Inter-Frequency Measurement indication message to the mobile station apparatus (step S13). Based on the control information indicated by the Inter-Frequency Measurement indication message, the mobile station apparatus 80 performs the Inter-Frequency Measurement processing (step S14), and includes the measurement result of the Inter-Frequency Measurement in a measurement report message to transmit (step S15). The network 81 receives the measurement report message, performs the Aggregation determination processing based on the measurement result (step S16), and in the case of performing the reconfiguration of Carrier Aggregation, includes information for changing the Aggregation state of the mobile station apparatus in an Aggregation reconfiguration message to transmit (step S17). The mobile station apparatus 80 performs the reconfiguration according to the designated information, while transmitting an Aggregation reconfiguration complete message to the network (step S18).

Figure 9:
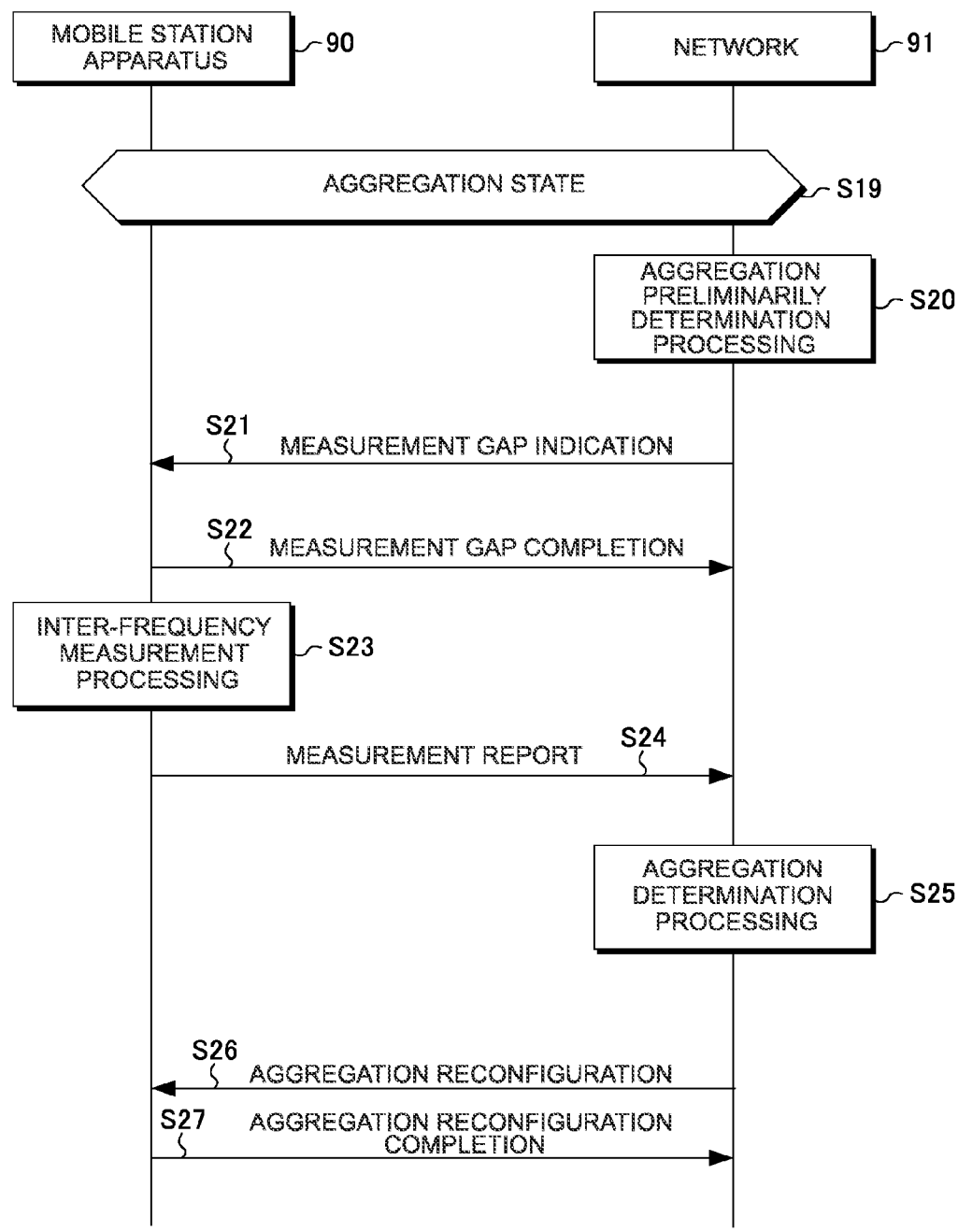
FIG. 9 is a sequence chart illustrating an Inter-Frequency Measurement procedure during a measurement gap in the mobile station apparatus in Embodiment 1 of the invention.

FIG. 9 is a diagram showing an example of a sequence chart illustrating Inter-Frequency Measurement with the need for gap control. FIG. 9 shows gap control in the Carrier Aggregation state. It is assumed that a mobile station apparatus of this Example has at least a reception bandwidth wider than 20 MHz, while having the capability enabling Carrier Aggregation. Further, it is assumed that the mobile station apparatus is in the Carrier Aggregation state (step S19) with all the reception bandwidths being used (the state of Time 63 in FIG. 6). A network in the figure includes base station apparatuses, control stations and upper control station.

The network 91 performs Aggregation preliminarily determination processing in a periodical or event manner (step 20), and when it is determined that the state requires the reconfiguration of Carrier Aggregation, transmits a measurement gap indication message to the mobile station apparatus (step S21). The mobile station apparatus 90 transmits a measurement gap complete report to the network 91 (step S22), performs the Inter-Frequency Measurement processing based on the control information indicated by the measurement gap indication message (step S23), and includes the measurement result of the Inter-Frequency Measurement in a measurement report message to transmit (step S24). The network 91 receives the measurement report message, performs the Aggregation determination processing based on the measurement result (step S25), and in the case of performing the reconfiguration of Carrier Aggregation, includes information for changing the Aggregation state of the mobile station apparatus in an Aggregation reconfiguration message to transmit (step S26). The mobile station apparatus 91 performs the reconfiguration according to the designated information, while transmitting an Aggregation reconfiguration complete message to the network (step S27).

The control message existing in EUTRA may be reused for each control message in FIGS. 7 to 9. For example, as the Inter-Frequency Measurement indication message, measurement gap indication message, Aggregation configuration message, and Aggregation reconfiguration message, by only adding a required parameter to an RRC Connection Reconfiguration message, it is possible to reuse the message. Similarly, as the measurement gap complete message, Aggregation configuration complete message, and Aggregation reconfiguration complete message, only by adding a required parameter to an RRC Connection Configuration Complete message, it is possible to reuse the message.

Figure 10:
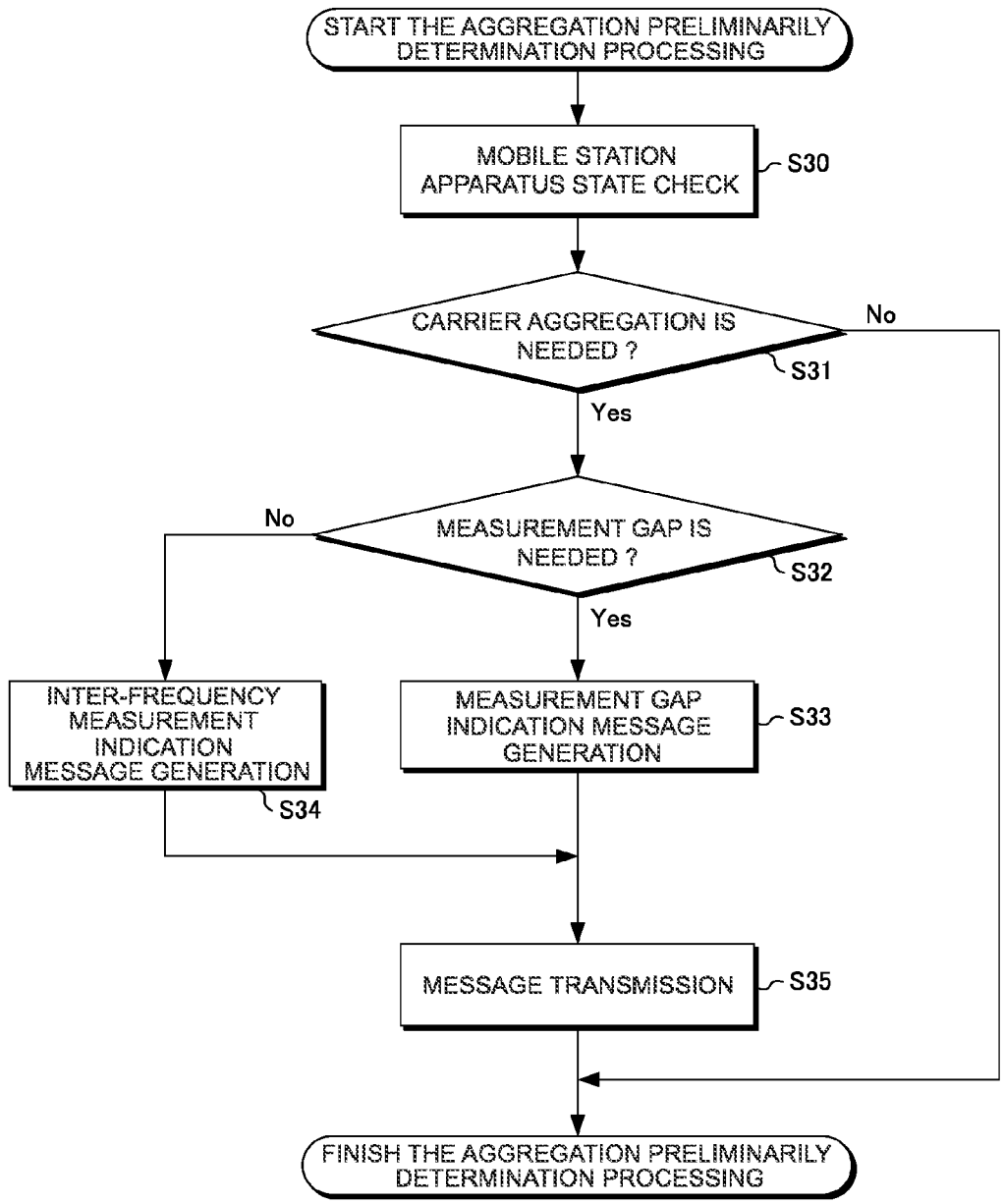
FIG. 10 is a flowchart illustrating a processing procedure of Aggregation preliminarily determination processing in the base station apparatus in Embodiment 1 of the invention.

FIG. 10 is a flowchart showing an example of the Aggregation preliminarily determination processing procedure of the network in FIGS. 7 to 9. The processing procedure is suitably performed in the base station apparatus, but the control station and upper control station may be provided with the processing procedure. In a mobile station apparatus state check (step S30), the network acquires information on the state of the mobile station apparatus under communication. Subsequently, it is comprehensively determined whether the mobile station apparatus requires Carrier Aggregation from the acquired information (step S31). For the determination whether or not Carrier Aggregation is needed, it is possible to use an increase/decrease in the downlink data buffer amount, downlink throughput, the content of the measurement result reported from the mobile station apparatus, the number of held users, etc. For example, when the downlink data buffer amount or downlink throughput (or that may be downlink average throughput) exceeds some predetermined threshold, it is determined that Aggregation is needed. Meanwhile, when the reported reception quality of the frequency band under communication exceeds or falls below some predetermined threshold, it is determined that Aggregation is needed. Herein, as the reception quality, a reception measurement value of a downlink reference signal is used which is indicated by EUTRA Carrier RSSI (Received Signal Strength Indicator), RSRP (Reference Signal Received Power), RSRQ (Reference Signal Received Quality), CQI (Channel Quality Indicator), path loss, etc. Alternately, when the number of held users exceeds or falls below some predetermined threshold, it is determined that Aggregation is needed. Further, it is naturally possible to make the determination by combining a plurality of these conditions.

When Carrier Aggregation is needed (Yes in step S31), a determination whether or not a measurement gap for Inter-Frequency Measurement is needed is subsequently made (step S32). When the mobile station apparatus is during Carrier Aggregation and uses all the receivers (reception sections), it is determined that a measurement gap is needed (Yes in step S32), and a measurement gap indication message is generated (step S33). Meanwhile, when it is possible to perform the Inter-Frequency Measurement without the measurement gap (No in step S32), i.e. when the number of frequency bands that the receivers of the mobile station apparatus receive is lower than the number of receivers, the base station apparatus generates an Inter-Frequency Measurement indication message (step S34). Then, the base station apparatus transmits the generated control message to the mobile station apparatus (step S35), and finishes the processing.

Herein, for a measurement gap, required is a parameter indicating a frequency band to generate the measurement gap (i.e. where the gap is generated among the Bands 62 to 64 at Time 63 in FIG. 6) among the frequency bands that the mobile station apparatus is receiving. Further, required as parameters is gap information such as gap start timing, gap interval, gap duration and gap valid period, frequency information such as the center frequency and bandwidth of the frequency band to measure, and cell information such as the cell ID and cell individual offset. These parameters are obtained from a combination of the information from the Broadcast Channel, a value in a fixed manner in the system, and a value designated by the measurement gap indication message.

In addition, when the mobile station apparatus already receives at least two or more frequency bands concurrently by Carrier Aggregation, it is suitable to select at least one frequency band to generate a measurement gap, for example, based on a criterion of the frequency band of low quality, frequency band with few traffic amount, or frequency band with a low priority. The selection is performed in the mobile station apparatus or network. The network may select a plurality of frequency bands to indicate, in order for the mobile station apparatus to measure a plurality of different frequencies.

For an Inter-Frequency Measurement indication message, the frequency information such as the center frequency and bandwidth of the frequency band to measure, and the cell information such as the cell ID and cell individual offset is required as parameters. These parameters are obtained from a combination of the information from the Broadcast Channel, a value in a fixed manner in the system, and a value designated by the measurement gap indication message. When a plurality of different frequencies exists as measurement targets, the priority to represent the order to measure may be configure. In this case, the priority may be designated by the broadcast information or may be designated individually by each downlink message. In addition, when Carrier Aggregation is not necessary, the processing is finished without any other processing.

The flowchart as shown in FIG. 10 is an example of the processing procedure, for example, in the base station apparatus in the network, and any other processing procedure may be used that is a method in which the base station apparatus determines the need for Carrier Aggregation from the state of the mobile station apparatus, and the need for a measurement gap in the case that Inter-Frequency Measurement is performed to select a frequency band to add for Aggregation Carrier, and based on the determination, transmits a corresponding control message to the mobile station apparatus. In addition, as described previously, it is also possible to provide the control station and upper control station with the processing procedure.

In FIG. 10, the description is given to the method of determining the presence or absence of designation of a measurement gap on Inter-Frequency Measurement for Carrier Aggregation, and it is also possible to apply the similar processing to Inter-Frequency Measurement for Inter-Frequency handover.

Figure 11:
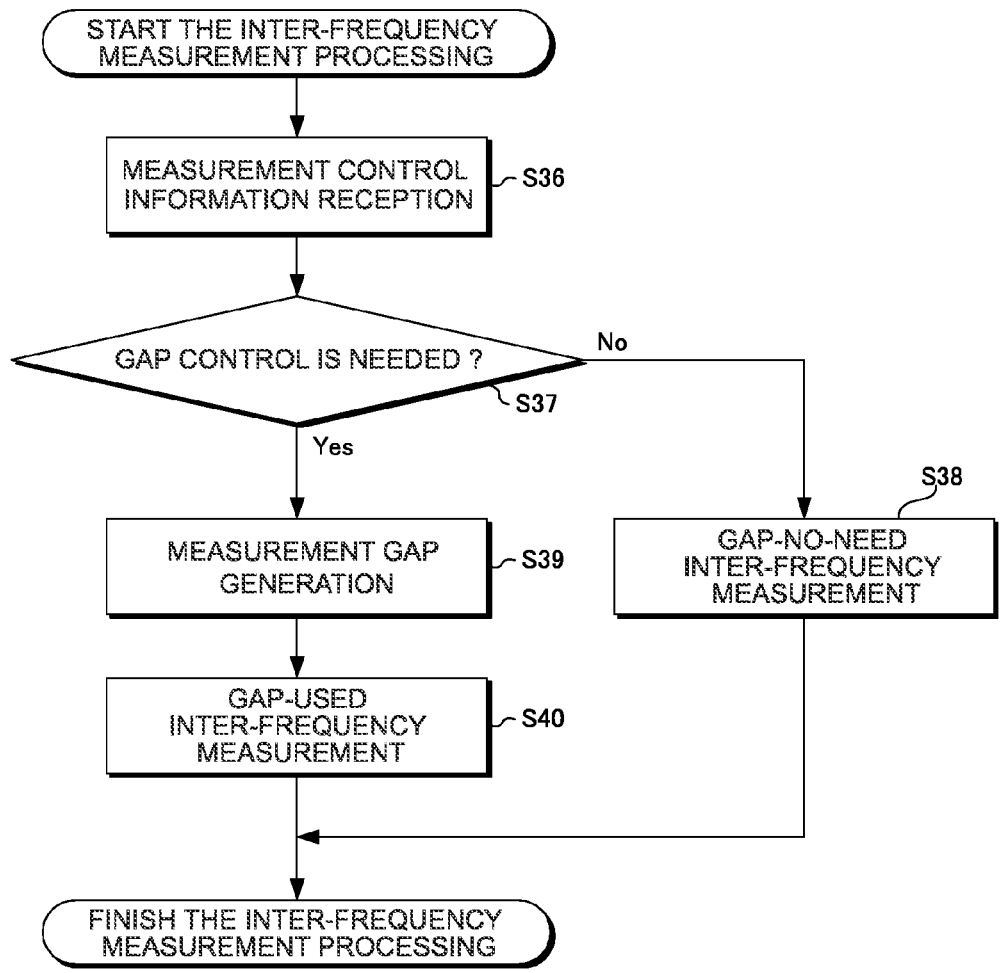
FIG. 11 is a flowchart illustrating a processing procedure of Inter-Frequency Measurement processing in the mobile station apparatus in Embodiment 1 of the invention.

FIG. 11 is a flowchart showing an example of the Inter-Frequency Measurement processing procedure of the mobile station apparatus in FIGS. 7 to 9. In measurement control information reception, the mobile station apparatus receives a downlink message concerning Inter-Frequency Measurement transmitted from the network, and checks the control content (step S36). Next, the mobile station apparatus determines whether a measurement gap is needed corresponding to the content of the downlink message (step S37). More specifically, when the downlink message is an Inter-Frequency Measurement indication message (No in step S37), the mobile station apparatus performs Inter-Frequency Measurement without the need for the gap so as not to affect the frequency band under reception (step S38). Meanwhile, when the downlink message is a measurement gap indication message (Yes in step S37), the mobile station apparatus generates a measurement gap based on a control parameter indicated by the control message (step S39), and performs Inter-Frequency Measurement using the gap in the generated measurement gap period (step S40).

The Inter-Frequency Measurement without the need for the gap in step S38 is performed when the number of received frequency bands is lower than the number of receivers (reception sections). In this case, the Inter-Frequency Measurement is performed using an unused receiver, and reception is continued in the frequency bands under reception. The Inter-Frequency Measurement without the need for the gap is performed based on the parameter designated by the Inter-Frequency Measurement indication message. Meanwhile, the Inter-Frequency Measurement using the gap in step S40 is performed when the number of received frequency bands is the same as the number of receivers. In this case, the measurement gap is generated in the frequency band that at least one of the receivers receives, and the Inter-Frequency Measurement is performed during the measurement gap. Reception is continued in the frequency bands in which the measurement gap is not generated. The measurement gap is generated in measurement gap generation based on the parameter designated by the measurement gap indication message. Then, the Inter-Frequency Measurement without the need for the gap is performed in the generated measurement gap period.

The flowchart as shown in FIG. 11 is an example of the processing procedure in the mobile station apparatus, and any other processing procedure may be used that is a method in which the mobile station apparatus determines whether or not to generate a measurement gap in Inter-Frequency Measurement from the received measurement control information, and based on the determination, executes the Inter-Frequency Measurement.

Figure 12:
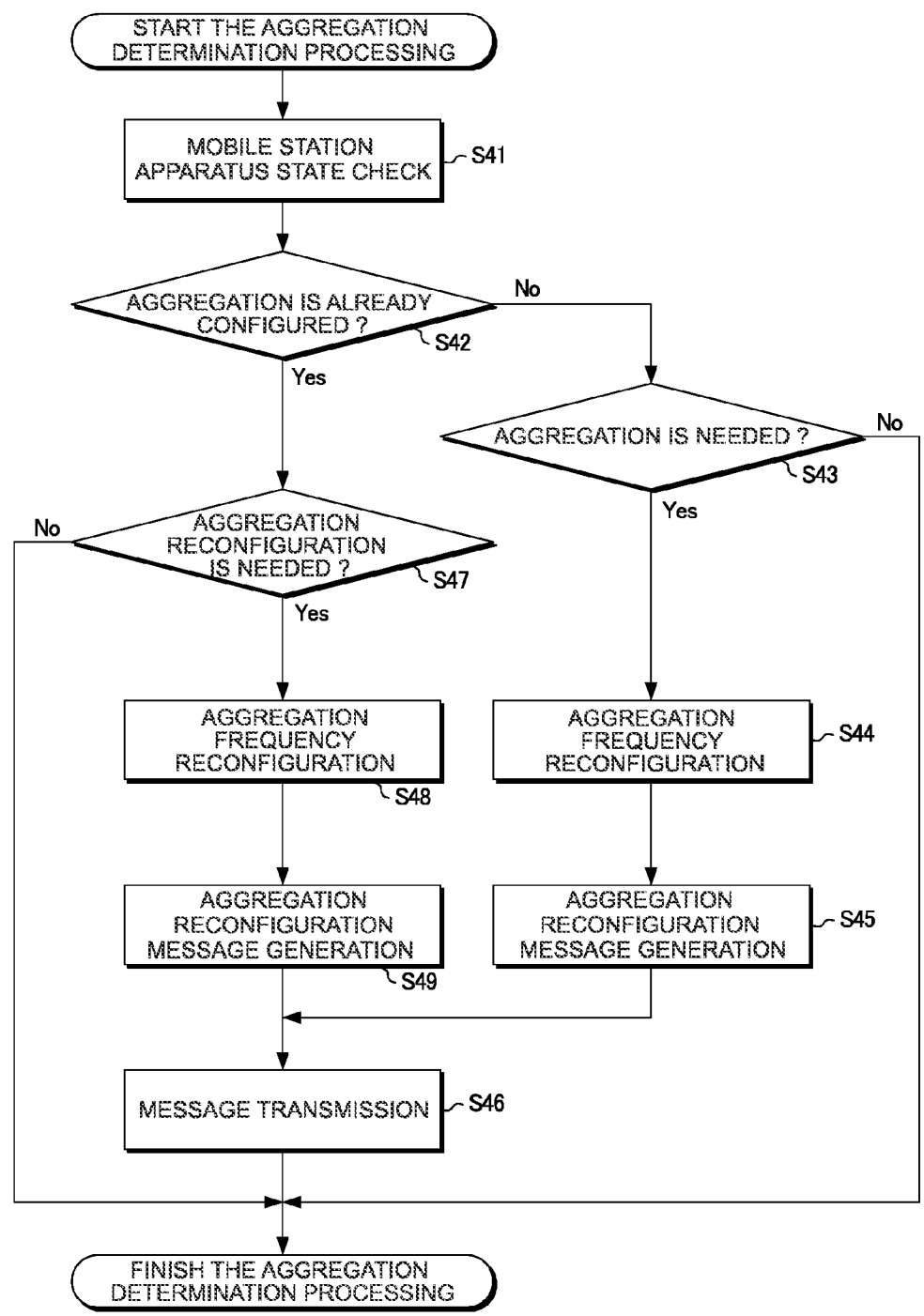
FIG. 12 is a flowchart illustrating a processing procedure of Aggregation determination processing in the base station apparatus in Embodiment 1 of the invention.

FIG. 12 is a flowchart showing an example of the Aggregation determination processing procedure of the network in FIGS. 7 to 9. The processing procedure is suitably performed in the base station apparatus, but the control station and upper control station may be provided with the processing procedure. First, in a mobile station apparatus state check (step S41), the base station apparatus acquires information on the state of the mobile station apparatus under communication. Subsequently, it is determined whether the targeted mobile station apparatus is already configured for Carrier Aggregation currently (during Aggregation) (step S42). When the mobile station apparatus is not during Aggregation (No in step S42), it is comprehensively determined whether the mobile station apparatus requires Carrier Aggregation from the acquired information (step S43). For the determination whether or not Carrier Aggregation is needed, it is possible to use an increase/decrease in the downlink data buffer amount, downlink throughput, the content of the measurement result reported from the mobile station apparatus, the number of held users, etc.

When Carrier Aggregation is not needed (No in step S43), the base station apparatus finishes the processing without any other processing. Meanwhile, when Carrier Aggregation is needed in step S43 (Yes in step S43), the base station apparatus selects a frequency band to newly receive for Aggregation in the Aggregation frequency configuration (step S44), and generates an Aggregation configuration message including the selected frequency information (step S45). The frequency information is selected based on a frequency band having quality of a predetermined threshold or more in the Inter-Frequency Measurement report from the mobile station apparatus, and a frequency band with few downlink traffic amount. Then, the base station apparatus transmits the Aggregation configuration message to the mobile station apparatus (step S46), and finishes the processing.

Meanwhile, when the mobile station apparatus is during Aggregation in step S42 (Yes in step S42), the base station apparatus makes a determination whether or not a change is required in a plurality of frequency bands selected for Aggregation (step S47). When the reconfiguration of the frequency bands is not needed (No in step S47), the base station apparatus finishes the processing without any other processing.

When the reconfiguration of the frequency bands is needed in step S47 (Yes in step S47), the base station apparatus selects a frequency band to change for Aggregation in the Aggregation frequency reconfiguration (step S48), and generates an Aggregation reconfiguration message including the selected frequency information (step S49). For example, the frequency information is selected based on a frequency band having quality of a predetermined threshold or more in the Inter-Frequency Measurement report from the mobile station apparatus, and a frequency band with few downlink traffic amount. The frequency band to be reconfigure can be added, deleted or exchanged at the same time. For example, the addition is to change the state of receiving two, A and B, frequency bands to receiving three, A, B and C, frequency bands. At this point, the A and B frequency bands that are originally received are continuously received. For example, the deletion is to change receiving three, A, B and C, frequency bands to receiving two, A and B, frequency bands. At this point, the A and C frequency bands without indications for deletion are continuously received. For example, the exchange is to change two, A and B, frequency bands to two, A and C, frequency bands to receive. At this point, the A frequency band without indications for exchange is continuously received. Then, the base station apparatus transmits the Aggregation reconfiguration message to the mobile station apparatus (step S46), and finishes the processing.

The flowchart as shown in FIG. 12 is an example of the processing procedure, for example, in the base station apparatus in the network, and any other processing procedure may be used that is a method in which the base station apparatus determines the need for Carrier Aggregation from the state of the mobile station apparatus, and the need for the Carrier Aggregation reconfiguration, and based on the determination, transmits a corresponding control message to the mobile station apparatus. In addition, as described previously, it is also possible to provide the control station and upper control station with the processing procedure.

Figure 13:
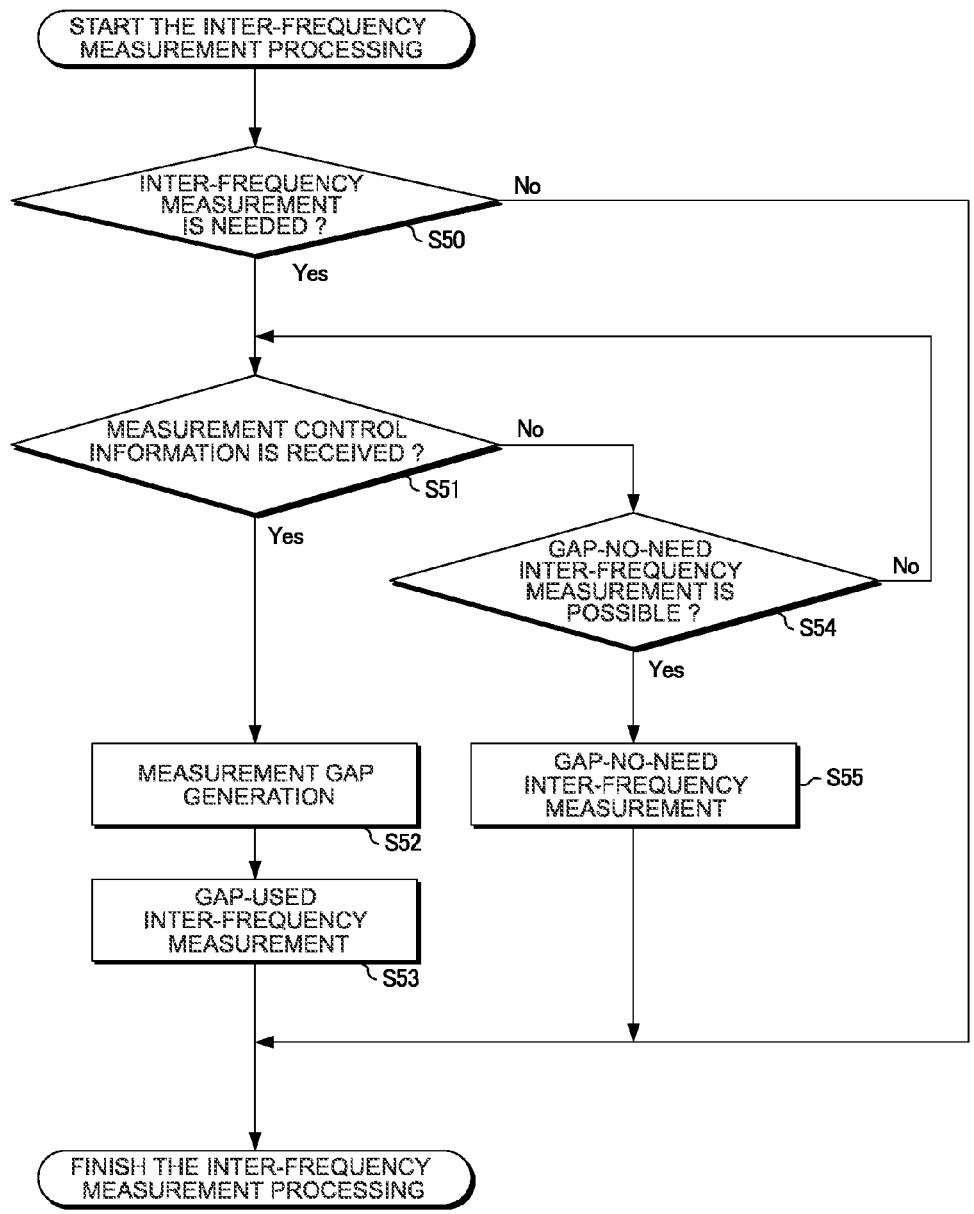
FIG. 13 is a flowchart illustrating another processing procedure of Inter-Frequency Measurement processing in the mobile station apparatus in Embodiment 1 of the invention.

Further, as a modification of the Inter-Frequency Measurement processing procedure as shown in FIG. 11, FIG. 13 shows an example of the case that the network does not transmit any Inter-Frequency Measurement indication message when the mobile station apparatus is capable of performing the Inter-Frequency Measurement without the need for a measurement gap. The mobile station apparatus makes a determination whether or not Inter-Frequency Measurement is needed (step S50). As a criterion by which to determine, it is possible to use downlink throughput, reception quality of the frequency band under communication, etc. For example, when downlink throughput (or that may be downlink average throughput) exceeds some predetermined threshold, it is determined that Inter-Frequency Measurement is needed. Meanwhile, when the reception quality of the frequency band under communication exceeds or falls below some predetermined threshold, it is determined that Inter-Frequency measurement is needed. Herein, as the reception quality, a reception measurement value of a downlink reference signal is used which is indicated by EUTRA Carrier RSSI, RSRP, RSRQ, CQI, path loss, etc. Alternately, in the case of during Aggregation, one or an average of a plurality of frequency bands may be used as the reception quality. The threshold is designated using the Broadcast Channel, designed using a value in a fixed manner in the system, or configure at an appropriate value by the mobile station apparatus. When it is determined that Inter-Frequency Measurement is not needed (No in step S50), the processing is finished without any other processing.

When Inter-Frequency Measurement is needed in step S50 (Yes in step S50), the mobile station apparatus checks whether a downlink message (only the measurement gap indication message in this example) concerning Inter-Frequency Measurement transmitted from the network is received in measurement control information reception (step S51). When the measurement gap indication message is received (Yes in step S51), the mobile station apparatus generates a measurement gap based on the control parameter indicated by the control message (step S52), and performs the Inter-Frequency Measurement using the gap in the generated measurement gap period (step S53).

Meanwhile, when the measurement gap indication message is not received in step S51 (No in step S51), the mobile station apparatus makes a determination whether it is possible to perform the Inter-Frequency Measurement without the need for the gap (step S54). The Inter-Frequency Measurement without the need for the gap is performed when the number of frequency bands being received is lower than the number of receivers (reception sections). When it is possible to perform the Inter-Frequency Measurement without the need for the gap (Yes in step S54), the Inter-Frequency Measurement is performed using an unused receiver (step S55), and the frequency band under reception is continuously received. The Inter-Frequency Measurement without the need for the gap is obtained from a combination of the information of the Broadcast Channel and a value in a fixed manner in the system. Meanwhile, when it is not possible to perform the Inter-Frequency Measurement without the need for the gap (No in step S54) i.e. when the number of frequency bands being received is the same as the number of receivers, the mobile station apparatus shifts to step S51, and waits for reception of the measurement gap indication message from the network.

The flowchart of FIG. 13 is an example of the processing procedure in the mobile station apparatus, and any other processing procedure may be used that is a method in which the mobile station apparatus determines whether to execute the Inter-Frequency Measurement without the need for the gap or the Inter-Frequency Measurement with the need for the measurement gap, based on the Aggregation state of the mobile station apparatus, the usage state of the receivers, and whether or not the measurement control information is received from the network, and based on the determination, executes Inter-Frequency Measurement.

According to this Embodiment, the mobile station apparatus performs the Inter-Frequency Measurement without the need for the measurement gap and the Inter-Frequency Measurement with the need for the measurement gap. Further, based on the state of the mobile station apparatus, the network switches between the Inter-Frequency Measurement without the need for the measurement gap and the Inter-Frequency Measurement with the need for the measurement gap.

According to this Embodiment, when it is possible to perform Inter-Frequency Measurement without a measurement gap, since the mobile station apparatus does not need to generate a measurement gap for Inter-Frequency Measurement, throughput of downlink data is improved. Further, since the mobile station apparatus is capable of performing Inter-Frequency Measurement irrespective of the measurement gap duration, measurement accuracy is improved in Inter-Frequency Measurement. As a result, the need is eliminated for transmitting unnecessary measurement reports, and power consumption is reduced. Furthermore, when the mobile station apparatus is capable of performing Inter-Frequency Measurement without a measurement gap, since the apparatuses (the base station apparatus, control station and upper control station) in the system do not need to generate the measurement gap, scheduling is simplified. Further, it is made possible to operate only a required minimum receiver (s) in Aggregation or in Inter-Frequency Measurement, and power consumption is reduced.

[Embodiment 2]

Embodiment 2 of the invention will be described below. In Embodiment 1 as described above, the control gap during Aggregation is designated flexibly by indications from the network. However, instead of configuration the measurement gap in an arbitrary frequency band, by limiting the frequency band configured for the measurement gap based on predetermined conditions, complexity is decreased in the mobile station apparatus and network. This Embodiment shows a method of sorting the frequency bands into a main carrier and non-main carrier, and thereby decreasing complexity. A reception apparatus and transmission apparatus of a mobile station apparatus, and a reception apparatus and transmission apparatus of a base station apparatus in this Embodiment may be the same as those in Embodiment 1.

The main carrier and non-main carrier shown in this Embodiment will be described below. The main carrier is a frequency band in which a control message is transmitted during the execution of Carrier Aggregation. The non-main carrier is a frequency band in which only traffic data is transmitted without the control message being transmitted. When Carrier Aggregation is not performed, the main carrier is equal to the frequency band under reception. The main carrier is selected by the network using an arbitrary method, and designated by the mobile station apparatus, or determined by the mobile station apparatus based a predetermined judgment. For example, when the network selects the main carrier, the network is capable of using the content of the measurement report reported from the mobile station apparatus, the number of held users, transmission bandwidth, transmission frequency, etc. When the mobile station apparatus determines the main carrier, the mobile station apparatus is capable of using the frequency band that is received before executing Aggregation, as the main carrier.

Figure 14:
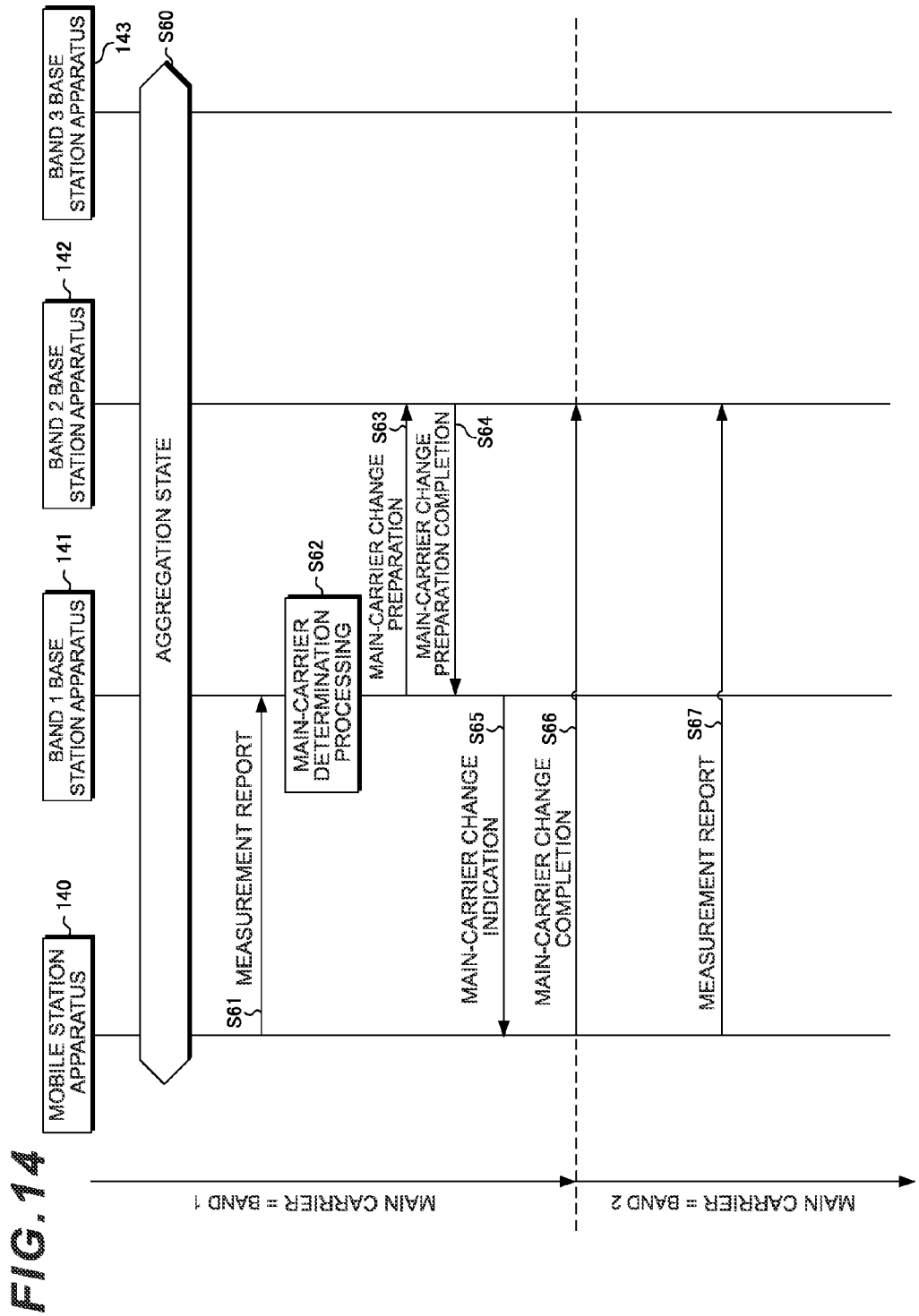
FIG. 14 is a sequence chart illustrating a main-carrier configuration procedure in Embodiment 2 of the invention.

FIG. 14 is a diagram showing an example of a sequence chart illustrating a main-carrier changing procedure. FIG. 14 shows the procedure for changing a main carrier in a state in which a mobile station apparatus 140 performs Carrier Aggregation. The mobile station apparatus 140 has the capability capable of concurrently receiving three frequency bands, and the sequence chart of this example starts from a state in which the mobile station apparatus 140 performs Carrier Aggregation with three base station apparatuses, Band 1 base station apparatus 141, Band 2 base station apparatus 142, and Band 3 base station apparatus 143. In addition, one base station apparatus may transmit a plurality of frequency bands. Then, shown is the example of changing the main carrier from the frequency band transmitted from the Band 1 base station apparatus 141 to the frequency band transmitted from the Band 2 base station apparatus 142. The main carrier at the start time is assumed to be the frequency band transmitted from the Band 1 base station apparatus 141. In other words, control messages (layer 3 messages) are transmitted and received between the mobile station apparatus 140 and the Band 1 base station apparatus 141, and are not transmitted or received between the mobile station apparatus 140 and the Band 2 base station apparatus 142 or the Band 3 base station apparatus 143.

The mobile station apparatus 140 performs measurements of the base station apparatuses under Aggregation (step S60) and their peripheral cells in the communicating state, and includes the measurement result in a measurement result report message to transmit to the Band 1 base station apparatus 141 (step S61). The Band 1 base station apparatus 141 performs main-carrier determination processing in a periodical or event manner (step S62), and when determining that a change in the main carrier is needed, transmits a main-carrier change preparation message to the base station apparatus 142 of the main carrier after the change using an inter-base station message (step S63). When the base station apparatus 142 of the main carrier after the change is capable of changing the main carrier, the base station apparatus 142 returns a main-carrier change preparation complete message as a response using an inter-base station message (step S64). In FIG. 14, the Band 1 base station apparatus 141 transmits a main-carrier change preparation message to the Band 2 base station apparatus 142, and the Band 2 base station apparatus 142 transmits a main-carrier change preparation complete message to the Band 1 base station apparatus 141.

Subsequently, the Band 1 base station apparatus 141 transmits a main-carrier change indication message to the mobile station apparatus (step S65). The mobile station apparatus 140 changes the main carrier based on the control information indicated by the main-carrier change indication message, and transmits a main-carrier change complete message to the Band 2 base station apparatus 142 (step S66). The mobile station apparatus 140 that has transmitted the main-carrier change complete message starts transmitting and receiving control messages to/from the Band 2 base station apparatus 142 (step S67).

The main-carrier change indication message includes information on the center frequency of the frequency band, cell ID of the base station apparatus or the like. Alternately, when it is necessary to change the uplink frequency band at the same time, the preamble information concerning the random access channel may be designated. The main-carrier change preparation message includes the cell ID or global ID, and information of the mobile station apparatus that the main carrier holds.

The control message existing in EUTRA may be reused for the control message in FIG. 14. For example, as the main-carrier change indication message, by only adding a required parameter to an RRC Connection Reconfiguration message, it is possible to reuse the message. Similarly, as the main-carrier change complete message, by only adding a required parameter to an RRC Connection Configuration Complete message, it is possible to reuse the message. In addition, in the case that Aggregation is not performed, the procedure for changing the main carrier may be the same as the normal handover procedure.

Figure 15:
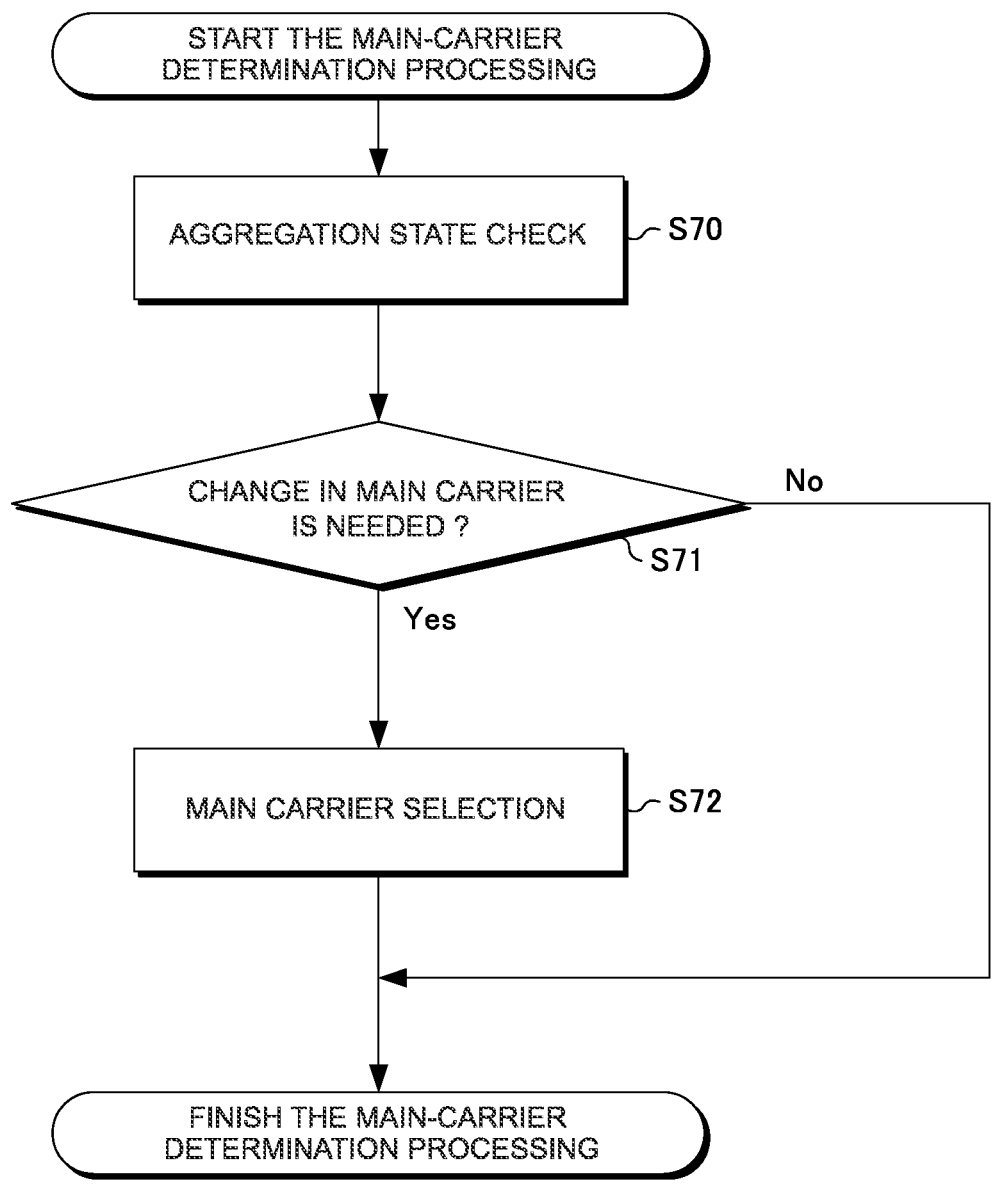
FIG. 15 is a flowchart illustrating a processing procedure of main-carrier determination processing in a base station apparatus in Embodiment 2 of the invention.

FIG. 15 is a flowchart showing an example of the main-carrier determination processing shown in step S62 in FIG. 14. The processing procedure is suitably performed in the base station apparatus configure as the main carrier, but the control station and upper control station may be provided with the processing procedure. In an Aggregation state check (step S70), the base station apparatus configure as the main carrier acquires information on Aggregation. Subsequently, it is comprehensively determined whether a change in the main carrier is needed from the acquired information (step S71). For the determination whether or not the change is needed, it is possible to use the content of the measurement report reported from the mobile station apparatus, the number of held users, transmission bandwidth, transmission frequency, etc. For example, when the reception quality of the frequency band of the base station apparatus of the main carrier falls below some predetermined threshold, it is determined that it is necessary to change the main carrier to the frequency band with the best reception quality.

Herein, as the reception quality, a reception measurement value of a downlink reference signal is used which is indicated by EUTRA Carrier RSSI, RSRP, RSRQ, CQI, path loss, etc. Meanwhile, when the number of held users of the base station apparatus of the main carrier exceeds a predetermined threshold, it is determined that it is necessary to change the main carrier to the frequency band with the lowest number of held users. Alternately, when the frequency band with a wider transmission bandwidth than that of the main carrier is newly received by Carrier Aggregation, it is determined that it is necessary to change the main carrier to the frequency band with the maximum transmission bandwidth. Further, when the transmission frequency with more excellent propagation characteristics than those of the main carrier is newly received by Carrier Aggregation, it is determined that it is necessary to change the main carrier to the frequency band of the best transmission frequency. The propagation characteristics are linearity of the frequency, for example. Further, it is naturally possible to make the determination by combining a plurality of these conditions.

When the change in the main carrier is not needed in step S71 (No in step S71), the processing is finished without any other processing. Meanwhile, when the change in the carrier frequency is needed in step S71 (Yes in step S71), the more suitable frequency band is selected as the main carrier (step S72), and the processing is completed. Any method among the above-mentioned methods may be used as the method of selecting the main carrier.

The flowchart shown in FIG. 15 is an example of the processing procedure, for example, in the base station apparatus configure as the main carrier, and any other processing procedure may be used that is a method in which the base station apparatus determines the need for changing the main carrier from the state of the mobile station apparatus and the state of the network, and based on the determination, is able to select an optimal main carrier. In addition, as described previously, it is also possible to provide the control station and upper control station with the processing procedure.

Figure 16:
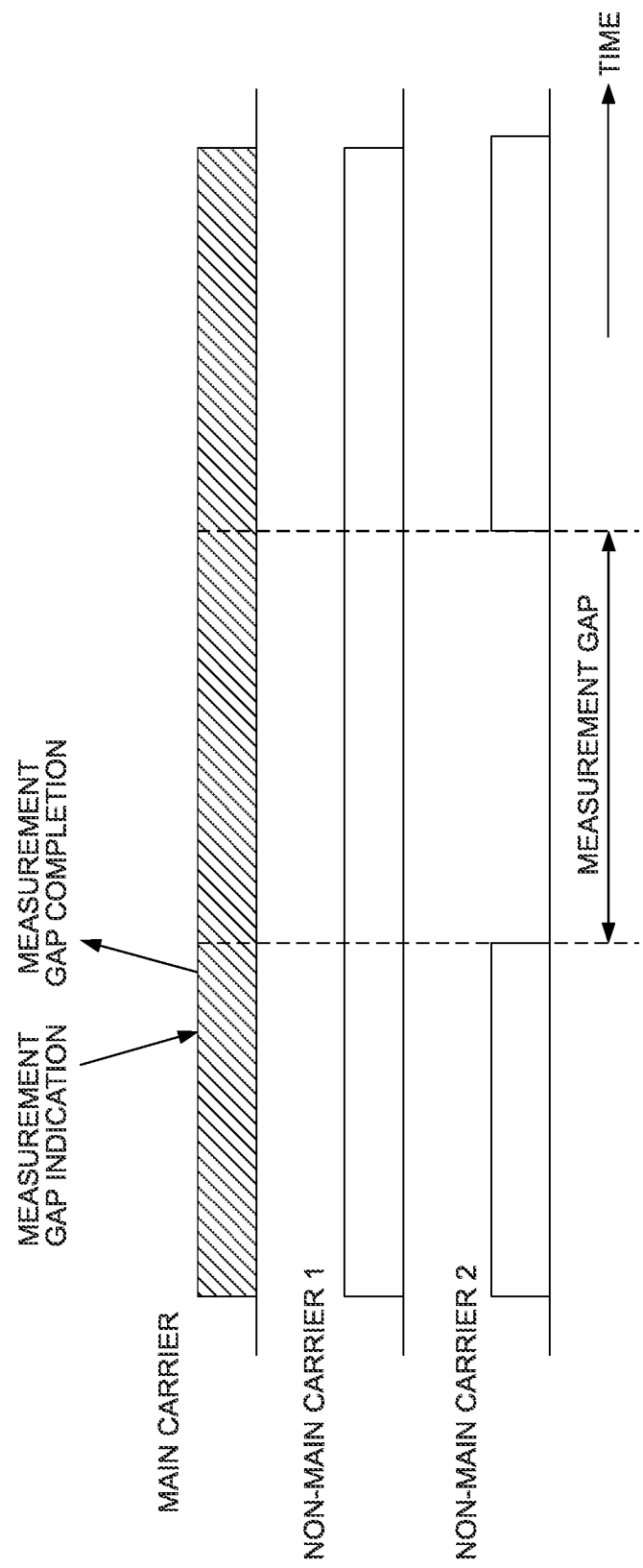
FIG. 16 is a diagram showing an example of the case of configuration a measurement gap on a non-main carrier in Embodiment 2 of the invention.

FIG. 16 is a diagram showing an example of the case of generating a measurement gap using the non-main carrier when the measurement gap is indicated. In the main carrier, since the need for generating a measurement gap is eliminated, there is the advantage that delay of the control message does not occur. In this case, when there is a plurality of non-main carriers, as well as the gap information such as gap start timing, gap interval, gap duration and gap valid period, included is the information for indicating a frequency band to generate the measurement gap (the center frequency and frequency ID (also referred to as EARFCN) of the frequency band, the cell ID of the base station apparatus, or a combination thereof).

Figure 17:
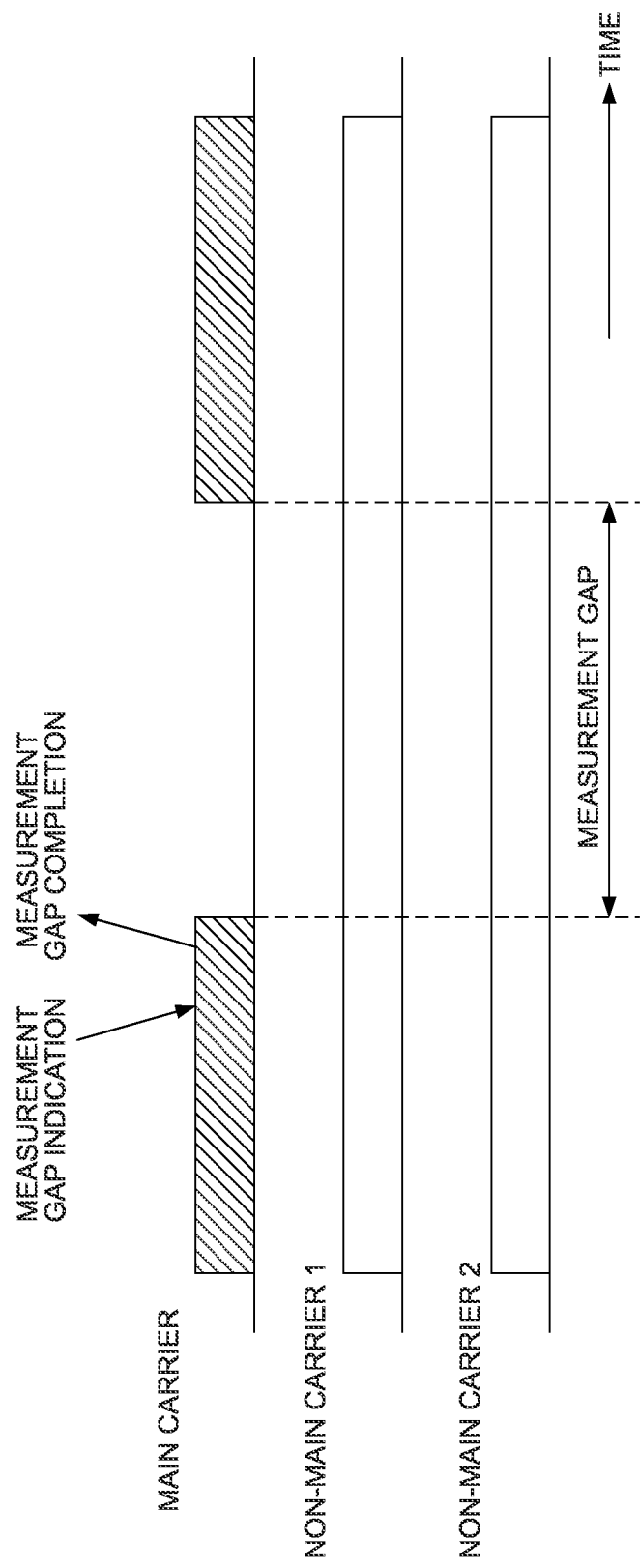
FIG. 17 is a diagram showing an example of the case of configuration a measurement gap on a main carrier in Embodiment 2 of the invention.

FIG. 17 is a diagram showing an example of the case of generating a measurement gap using the main carrier when the measurement gap is indicated. As distinct from FIG. 16, since the measurement gap is generated only in the main carrier, the information for indicating a frequency band to generate the measurement gap is not needed. Further, the method of generating a measurement gap is the same irrespective of the presence or absence of Carrier Aggregation, and there is the advantage that the processing procedure is simplified. Furthermore, it is possible to share the processing concerning gap generation with EUTRA.

According to this Embodiment, the mobile station apparatus and network sort the frequency bands under Carrier Aggregation to the main carrier and non-main carrier. Then, the measurement gap is generated in either one to perform Inter-Frequency Measurement.

According to this Embodiment, in addition to the effect of Embodiment 1, since the mobile station apparatus and the apparatuses (the base station apparatus, control station and upper control station) in the system are capable of simplifying the processing procedure on the measurement gap, the circuit configuration is simplified.

In addition, in the above-mentioned Embodiments, control of the mobile station apparatus and the base station apparatus may be performed by storing a program to actualize the function of each component or part of these functions of the mobile station apparatus and the base station apparatus in a computer readable recording medium, and making a computer system read the program stored in the recording medium to execute. In addition, the "computer system" described herein includes hardware of OS, peripheral devise and the like. Further, the "computer readable recording media" means a transportable medium such as a flexible disk, magneto-optical disk, ROM and CD-ROM, and a storage device such as a hard disk incorporated into the computer system. Furthermore, the "computer readable recoding media" also includes equipment, such as a communication line when the program is transmitted via a network such as the Internet and a communication channel such as telephone lines, which dynamically holds the program in a short time, and a device, such as volatile memory inside the computer system that is the server and client in this case, which holds the program during a predetermined time. Moreover, the above-mentioned program may be to actualize part of the functions as described previously, and further, may be to actualize the functions as described previously in a combination with a program already stored in the computer system.

As described above, the Embodiments of the invention are described specifically with reference to the drawings, but the specific configurations are not limited to the Embodiments, and the design and the like within the scope without departing from the subject matter of the invention are included in the scope of the claims.

The invention claimed is:

1. A mobile station apparatus provided in a mobile communication system that includes a base station apparatus and the mobile station apparatus, wherein the mobile station apparatus is configured to perform communications with the base station apparatus by using a plurality of frequencies together and the plurality of frequencies being configured by the base station apparatus, the mobile station apparatus comprising:
   a first circuitry configured or programmed to notify the base station apparatus of a mobile station apparatus capability indicating measurement ability for first measurement or second measurement on the communication, wherein
   the first measurement is performed by using a measurement gap, and
   the second measurement is performed by not using a measurement gap; and
   a second circuitry configured or programmed to perform the first measurement or the second measurement, based on information for the measurement gap, reception quality of one of the frequencies and the measurement ability.

2. A processing method performed in a mobile station apparatus provided in a mobile communication system that includes a base station apparatus and the mobile station apparatus, wherein the mobile station apparatus is configured to perform communications with the base station apparatus by using a plurality of frequencies together and the plurality of frequencies being configured by the base station apparatus, the processing method comprising:
   notifying the base station apparatus of a mobile station apparatus capability indicating measurement ability for first measurement or second measurement on the communication, wherein
   the first measurement is performed by using a measurement gap, and
   the second measurement is performed by not using a measurement gap; and
   performing the first measurement or the second measurement, based on information for the measurement gap, reception quality of one of the frequencies and the measurement ability.

3. A processing device mounted in a mobile station apparatus provided in a mobile communication system that includes a base station apparatus and the mobile station apparatus, wherein the mobile station apparatus is configured to perform communications with the base station apparatus by using a plurality of frequencies together and the plurality of frequencies being configured by the base station apparatus, the processing device comprising:
   a first circuitry configured or programmed to notify the base station apparatus of a mobile station apparatus capability indicating measurement ability for first measurement or second measurement on the communication, wherein
   the first measurement is performed by using a measurement gap, and
   the second measurement is performed by not using a measurement gap; and
   a second circuitry configured or programmed to perform the first measurement or the second measurement, based on information for the measurement gap, reception quality of one of the frequencies and the measurement ability.

* * * * *